(12) United States Patent
Covitz et al.

(10) Patent No.: US 8,725,818 B1
(45) Date of Patent: May 13, 2014

(54) AUTOMATED PARTICIPANTS WITH ACCESS TO ATTACHMENTS IN HOSTED CONVERSATIONS

(75) Inventors: Seth Andrew Covitz, San Jose, CA (US); Jimin Li, Hayward, CA (US); Hsinchao Liao, Fremont, CA (US)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 13/109,938

(22) Filed: May 17, 2011

Related U.S. Application Data

(60) Provisional application No. 61/475,613, filed on Apr. 14, 2011, provisional application No. 61/345,994, filed on May 18, 2010.

(51) Int. Cl.
*G06F 15/16* (2006.01)

(52) U.S. Cl.
USPC ........... 709/206; 709/204; 709/205; 709/207; 709/219

(58) Field of Classification Search
USPC .................................. 709/201–207, 217–219
See application file for complete search history.

(56) References Cited

U.S. PATENT DOCUMENTS

| | | | |
|---|---|---|---|
| 6,505,233 B1 * | 1/2003 | Hanson et al. ................. | 709/204 |
| 7,222,156 B2 | 5/2007 | Gupta et al. ................... | 709/206 |
| 2003/0081000 A1 * | 5/2003 | Watanabe et al. ............. | 345/751 |
| 2006/0259957 A1 * | 11/2006 | Tam et al. ........................ | 726/3 |
| 2009/0144392 A1 * | 6/2009 | Wang et al. .................... | 709/217 |
| 2010/0070601 A1 * | 3/2010 | Aaron et al. ................... | 709/206 |
| 2010/0241968 A1 * | 9/2010 | Tarara et al. ................... | 715/751 |
| 2010/0250653 A1 * | 9/2010 | Hudgeons et al. ............ | 709/203 |
| 2012/0011027 A1 * | 1/2012 | Okuyama .................. | 705/26.41 |

* cited by examiner

*Primary Examiner* — Awet Haile
*Assistant Examiner* — Eric Myers
(74) *Attorney, Agent, or Firm* — Patent Law Works LLP

(57) ABSTRACT

A conversation server stores a hosted conversation. The conversation has an attachment that is stored at the conversation server. The conversation has an automated participant, where the automated participant is a computer-implemented participant that operates in accordance with instructions stored on an automated participant server that is distinct from the conversation server. The conversation server provides the automated participant with access to the attachment and subsequently receives, from the automated participant, a request to modify the attachment. In response to the request, the conversation server modifies the attachment in accordance with the request.

20 Claims, 25 Drawing Sheets

AUTOMATED PARTICIPANTS WITH ACCESS TO ATTACHMENTS IN HOSTED CONVERSATIONS

RELATED APPLICATIONS

This application claims priority to U.S. Provisional Patent Application Nos. 61/475,613, filed Apr. 14, 2011, entitled "Managing Attachments in Hosted Conversations," and 61/345,994, filed May 18, 2010 entitled "Managing Media Content in Hosted Conversations," which are incorporated herein by reference in their entirety.

TECHNICAL FIELD

The disclosed embodiments relate generally to communication systems. More particularly, the disclosed embodiments relate to methods, systems, and user interfaces for transmitting, receiving, and rendering attachments in electronic messages such as hosted conversations.

BACKGROUND

A variety of electronic communications systems, including electronic email ("email") systems and instant messaging (IM) system are well known. Such communication systems are frequently used for collaboration on documents or other electronic files. In such communication systems documents or other electronic files can typically be added as attachments. However, in such communication systems, the presence of attachments serves merely to provide access to the attachment to users. In order to display, modify or otherwise interact with the attachment, the users must download a local copy of the attachment. Moreover, any display, modification or other interaction with the attachment that is performed by a user is not known to other recipients of the email or other participants in the IM chat. In order to share modifications or interactions with attachment, the user must send the revised attachment to other users. This method of sharing modifications to attachments is inefficient, because it requires substantial user intervention and creates situations where multiple users have modified an attachment, resulting in multiple competing versions of the attachment. These shortfalls of conventional communication systems become increasingly problematic as the number of users collaborating on the attachment increases.

SUMMARY

Thus, it would be advantageous to provide a system and method for improving the ability of users to collaborate on attachments in conversations by providing embedded applications and automated participants with access to attachments of conversations in a communication system. The problems with conventional communication systems described above are reduced or eliminated by the systems and methods described below.

Some embodiments provide a method performed at a client having one or more processors and memory storing one or more programs for execution by the one or more processors so as to perform the method. The method includes displaying a hosted conversation that is hosted at a conversation server, where the conversation has an attachment that is stored at the conversation server and the conversation includes application information enabling the client to run an embedded application. The embedded application originates from an application server that is distinct from the conversation sever system. The method further includes running the embedded application. The embedded application: accesses the attachment and processes the attachment to generate output data for display within the conversation, and the output data is displayed within the conversation.

Some embodiments provide a method performed at a conversation server having one or more processors and memory storing one or more programs for execution by the one or more processors so as to perform the method. The method includes storing a hosted conversation, where the conversation has an attachment that is stored at the conversation server; and the conversation includes application information enabling a client to request code for an embedded application. The embedded application originates from an application server that is distinct from the conversation server. The method further includes receiving, from the embedded application, a request for access to the attachment; and providing the embedded application access to the attachment, where the provided access enables the embedded application to processes the attachment so as to generate output data for display within the conversation.

Some embodiments provide, a method for, at a at a conversation server having one or more processors and memory storing one or more programs for execution by the one or more processors so as to perform the method, storing a hosted conversation, where the conversation has an attachment that is stored at the conversation server and the conversation has an automated participant, and the automated participant is a computer-implemented participant that operates in accordance with instructions stored on an automated participant server that is distinct from the conversation server. The method further includes providing the automated participant access to the attachment; receiving, from the automated participant, a request to modify the attachment; and in response to the request, modifying the attachment in accordance with the request.

Some embodiments provide, a method for, at a at a conversation server having one or more processors and memory storing one or more programs for execution by the one or more processors so as to perform the method, storing a hosted conversation, where the conversation has an automated participant, and the automated participant is a computer-implemented participant that operates in accordance with instructions stored on an automated participant server that is distinct from the conversation server. The method further includes providing the automated participant access to content of the conversation; and receiving, from the automated participant, an attachment generated based on at least a portion of the content of the conversation.

In accordance with some embodiments, a computer system (e.g., a client or a conversation server) includes one or more processors, memory, and one or more programs; the one or more programs are stored in the memory and configured to be executed by the one or more processors and the one or more programs include instructions for performing the operations of the method described above. In accordance with some embodiments, a computer readable storage medium has stored therein instructions which when executed by one or more processors, cause a computer system (e.g., a client or a conversation server) to perform the operations of the methods described above.

BRIEF DESCRIPTION OF THE DRAWINGS

Various embodiments of the invention are disclosed in the following Description of Embodiments herein, in conjunction with the following drawings in which like reference numerals refer to corresponding parts throughout the figures.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the scope of the invention to these particular embodiments. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention can be practiced without these particular details. In other instances, methods, procedures, components, and networks that are well known to those of ordinary skill in the art are not described in detail to avoid obscuring relevant aspects of the disclosed embodiments.

Figure 1:
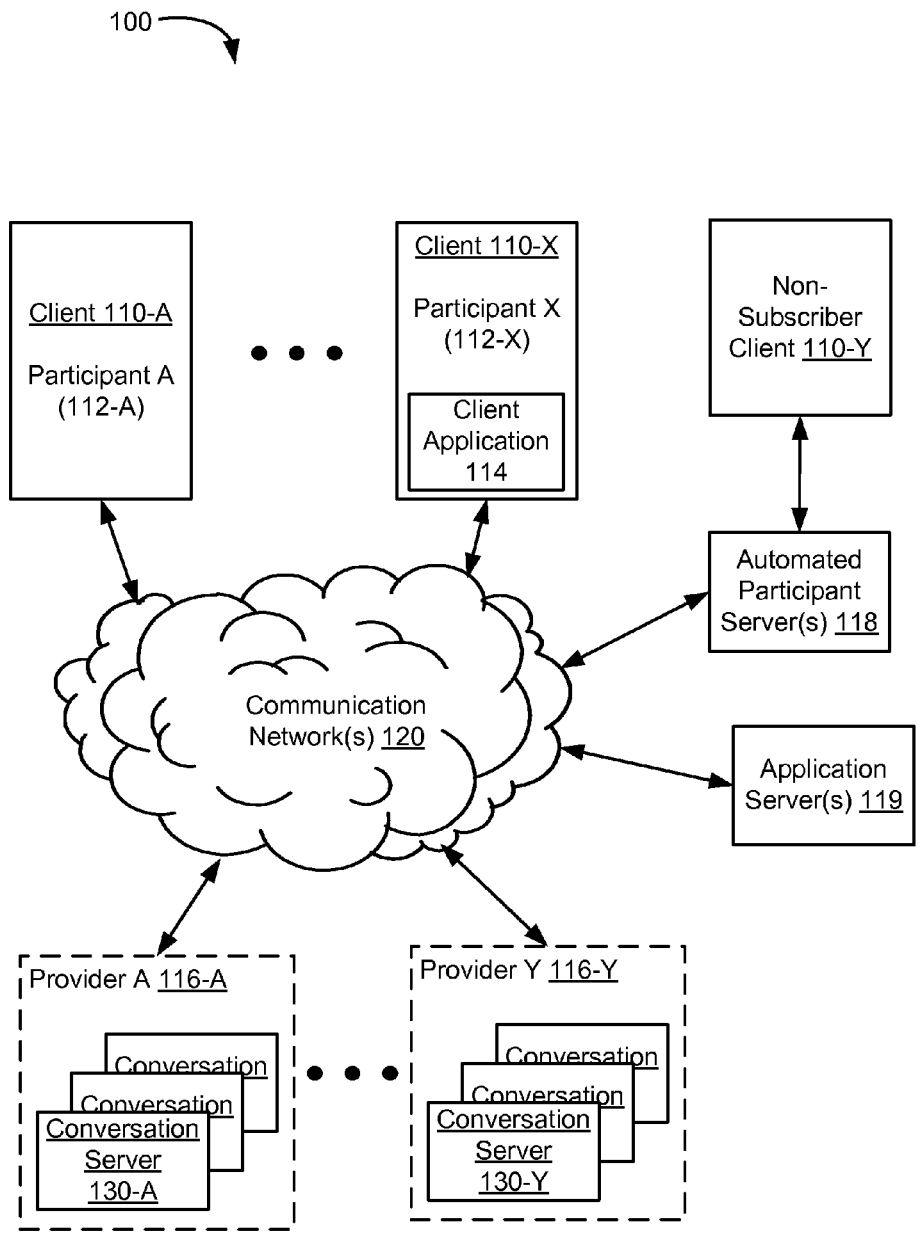
FIG. 1 is a block diagram illustrating an exemplary distributed computer system according to certain embodiments.

FIG. 1 is block diagram illustrating an exemplary distributed computer system 100 according to certain embodiments. Distributed computer system 100 includes a plurality of clients 110. Users of clients 110 (also herein called client devices, client systems or client computers) are participants 112 in conversations hosted by a set of conversation servers 130 (sometimes called a conversation server system). Sometimes these conversations (conversations hosted by a set of conversation servers) are called "hosted conversations." Clients 110 can be any of a number of computing devices (e.g., Internet kiosk, personal digital assistant, cell phone, gaming device, desktop computer, laptop computer, handheld computer, tablet computer, or combinations thereof) used to enable the activities described below. Each client 110 is coupled to a network 120, which can be any of a number of networks (e.g. Internet, intranet, local area network, wide area network, wireless network, wired network, optical network, or a combination of such networks). More generally, clients 110 and conversation servers 130 are coupled to each other via one or more communication networks 120.

Additionally, various other servers may be a part of the distributed computer system 100. In some embodiments, the distributed computer system 100 includes an automated participant server 118 that communicates with conversation server(s) 130 and clients 110 via communication network 120, so as to participate in conversations. In some embodiments, automated participant server 118 is a third-party server (e.g., a server which is owned, and/or operated by a party other than: the party that owns and/or operates conversation server 130 and the party that owns and/or operates client 110.) However, automated participant server 118 can also be a pseudo third-party server, which is owned and/or operated by the same party that owns and/or operates conversation server 130, but that is not integrated into the conversation system. For example, an operator of a conversation system could provide one or more automated participant servers that are available for third parties to host automated participant code so as to ensure that the code is readily available without substantively controlling the content of the automated participant code. It should be understood that in other embodiments, the content of the automated participant code is only constrained by a predefined set of guidelines (e.g., guidelines intended to prohibit malicious behavior) but is otherwise not controlled by the operator of the conversation system. In most implementations, however, automated participant server 118 is distinct from conversation server 130.

In some embodiments, the distributed computer system 100 includes an application server 119 that communicates with conversation server(s) 130 and clients 110 via communication network 120, so as to provide code enabling embedded applications to be inserted into conversations. In some embodiments, application server 119 is a third-party server, which is owned, and/or operated by a party other than: the party that owns and/or operates conversation server 130 and the party that owns/operates client 110. However, application server 119 can also be a pseudo third-party server, which is owned and/or operated by the same party that owns and/or operates conversation server 130, but that is not integrated into the conversation system. For example, an operator of a conversation system could provide one or more servers that are available for third parties to host embedded application code so as to ensure that the code is readily available without substantively controlling the content of the embedded applications. It should be understood that in other embodiments, the content of the embedded applications is only constrained by a predefined set of guidelines (e.g., guidelines intended to prohibit malicious behavior) but is otherwise not controlled by the operator of the conversation system. In most implementations, however, application server 119 is distinct from conversation server 130.

A respective client (e.g., 110-A) executes a client application 114 that facilitates access from client 110 to a respective conversation server (e.g., 130-A). Client application 114 may include a graphical user interface. For example, client application 114 may be a web browser or other browser application, such as Firefox (trademark of Mozilla Foundation), Internet Explorer (trademark of Microsoft Corporation), Safari (trademark of Apple Inc.), or Chrome (trademark of Google Inc.).

While a conversation system (e.g., a hosted conversation system with a shared communication protocol that enables different conversation servers to communicate with each other and users who have communications accounts with one conversation server to interact with users who have communications accounts with another conversation server) may have a single conversation server 130, in other embodiments the conversation system may have multiple conversation servers 130. For example, multiple conversation servers 130-A and 130-Y may be hosted by different service providers, such as providers 116-A and 116-Y respectively. In some embodiments, the providers are internet service providers (ISPs) providing a conversation service. Alternately, some or all of the providers may be dedicated conversation providers. When conversation system includes multiple conversation servers 130, conversation servers 130 may be coupled together directly, or by a local area network (LAN), or via network 120.

Conversation server(s) 130 host conversations that include contributions from one or more of participants 112. More specifically, each conversation server 130 hosts conversations on behalf of a set of users. At least some of those users are subscribers of the conversation system and thus have user communications accounts. However, as described in more detail below, some of the conversation participants need not be subscribers of the conversation system. When new content is added to a conversation by any participant, or any other changes are made to a conversation by any participant, the updates are sent to all the conversation servers 130 that host conversations for the participants in the conversation. Those host servers, in turn, send the updates to clients 110 being used by participants in the conversation. The conversation updates may be sent relatively instantaneously (e.g., within a second or two) to clients 110 of active participants in the conversation. Optionally, clients 110 of passive participants who are online and logged into the conversation system, but who are not currently viewing the conversation or are not current participating in the conversation, receive information that the conversation has been updated, without receiving the updates to the conversation. In at least some embodiments, when the participant "opens" the conversation (selects it for viewing), the updated conversation is downloaded to the participant's client 110 from conversation server 130 that hosts conversations for that participant.

Figure 2:
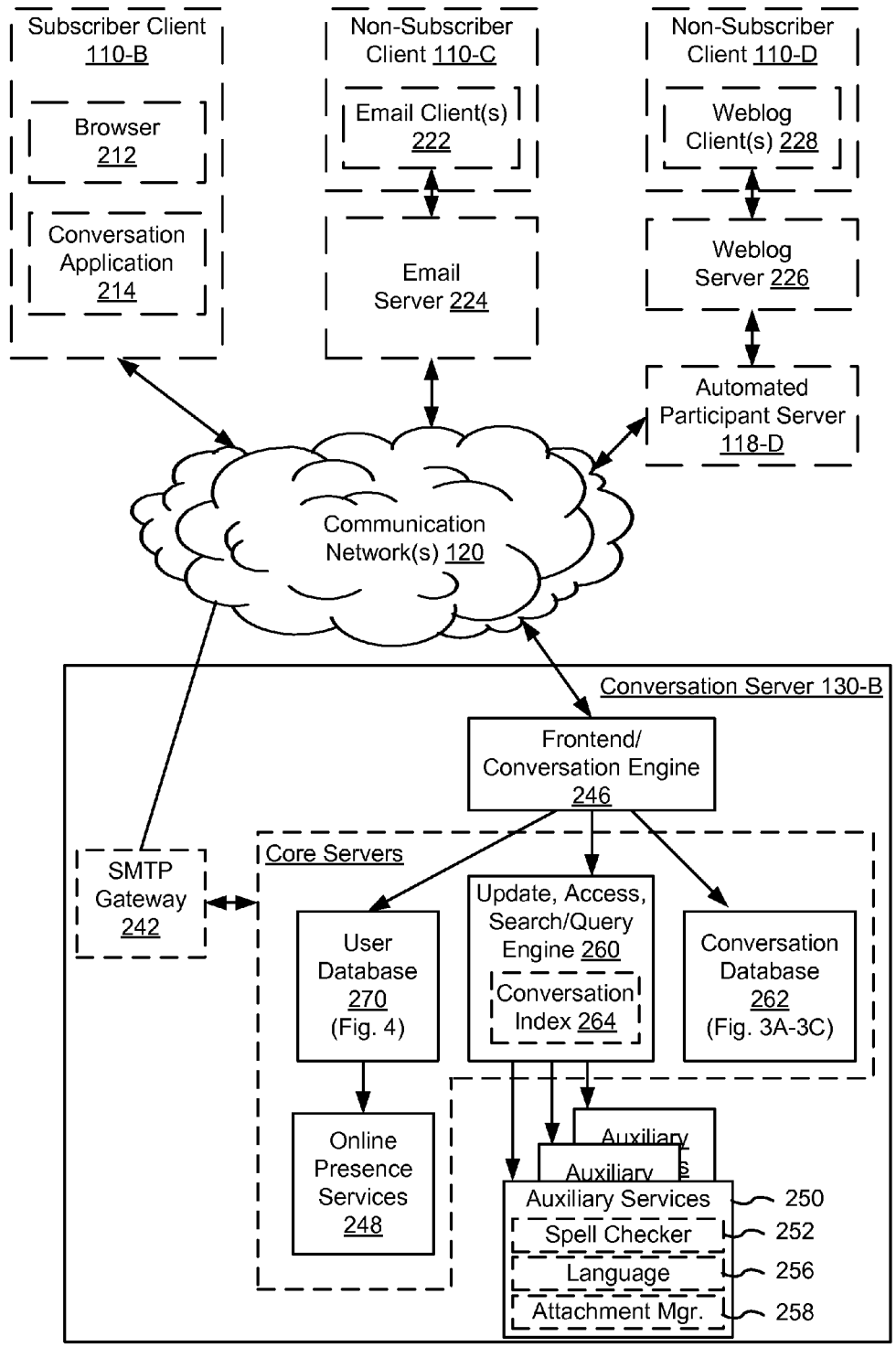
FIG. 2 is a block diagram of a distributed system including a conversation server and clients coupled by one or more communication networks, according to certain embodiments.

Attention is now directed towards FIG. 2, which illustrates an exemplary embodiment of a respective conversation server 130-B and respective clients 110-B, 110-C and 110-D. As shown in FIG. 2, respective conversation server 130-B communicates with a plurality of clients 110 through a communication network 120. FIG. 2 illustrates two primary types of clients: subscriber clients (e.g., 110-B) and non-subscriber clients (e.g., 110-C and 110-D). A subscriber client is a client that is being used by a user who has subscribed to the conversation system (e.g., has a communications account with a username/userid and password) and is a participant in one or more conversations in the conversation system. Typically, the conversation system communicates with at least one subscriber client (e.g., 110-B). In some embodiments, a subscriber client includes an executable application, such as a browser 212, to facilitate participant interaction with a respective conversation server 130. In some embodiments, browser 212 includes (or controls) a virtual machine (e.g., a Java virtual machine) for executing software embedded in web pages and other documents rendered by browser 212. In some embodiments, browser 212 executes a conversation application 214 that is embedded, at least in part, in a web page. Typically, browser 212 is a web browser or other browser application, such as Firefox (trademark of Mozilla Foundation), Internet Explorer (trademark of Microsoft Corporation), Safari (trademark of Apple Inc.), or Chrome (trademark of Google Inc.). The web page (which may be called a "hosted conversation web page") is downloaded from a server, such as a conversation server 130-B, to client 110-B and includes executable instructions that are executed by the virtual machine of browser 212 in client 110-B. In some embodiments, browser 212 and conversation application 214 together form client application 114 of FIG. 1. Conversation application 214 facilitates participant interaction with conversation server system 130. In some other embodiments, conversation application 214 is a plug-in or extension of browser application 212.

Non-subscriber clients (e.g., 110-C and 110-D in FIG. 2) enable users who do not have communications accounts in the conversation system to participate, in at least a limited manner, in conversations hosted by conversation servers 130 in the conversation system. Participation in conversations by non-subscriber clients (e.g., 110-C and 110-D) may be limited in a number of ways. For example, the user of a non-subscriber client may be allowed to read the content of a conversation, allowed to contribute new content, but not allowed to use other features of the conversation system such as editing content already in the conversation, responding to specific portions of content previously contributed by other participants, and playing back a history of a conversation using a history log of changes to the conversation.

Non-subscriber clients (e.g., 110-C and 110-D) access conversation server 130 in a manner that is distinct from the manner used by subscriber clients (e.g., 110-B) whose users are subscribers of the conversation system (e.g., via an automated participant server 118, as illustrated in FIG. 1). In some embodiments, the functions of the automated participant server are integrated with a pre-existing component of the non-subscriber's communication system (e.g., email server 224 in FIG. 2 includes the required protocols and instructions for performing the role of an automated participant server 118). In some other embodiments, the non-subscriber's communication system sends information to a separate automated participant server, which enables the non-subscriber to participate in a conversation of the conversation system as an automated participant (e.g., weblog server 226 transmits/receives additions or changes to the conversation via a separate automated participant server 118-D which includes the required protocols and instructions for communicating with the conversation system).

An example of a non-subscriber client 110-C is an email server 224, having email clients 222. Content from host conversations can be sent to one or more email clients 222 of one or more email servers 224. In particular, when the user of an email client 222 is added as a participant to a conversation, content of the conversation (and content subsequently added to the conversation) is transmitted to email client 222 by the conversation server (e.g., 130-B in FIG. 2) that hosts the conversation via email server 224, which acts as an automated participant server. For example, a user of an email client 222 may participate in a hosted conversation by sending emails to conversation server 130-B via email server 224, and receive updates to the hosted conversation in the form of emails from conversation server 130-B. Thus, in some embodiments, the user of email client 222 is able to interact with the hosted conversation using a standard email interface.

Another example of a non-subscriber client 110-D is a weblog ("blog") server 226, having a weblog client 228. As described below, a hosted conversation can include a weblog 228 (also called a weblog client) as a participant in a hosted conversation, in which case content of the hosted conversation is published in the weblog. The published conversation is visible on weblog 228, which is hosted by weblog server 226. More specifically, when a weblog 228 is added as a participant to a conversation via an automated participant server 118-D, content of the conversation is transmitted from the conversation server 130-B that hosts the conversation to (also called "posted to") weblog 228 via automated participant server 118-D. After weblog 228 is added as a participant, new content added to the conversation is also transmitted from conversation server 130-B to weblog 228 via automated participant server 118-D. A user (e.g., a user of another client 110, FIG. 1) who views content of weblog 228 (e.g., by visiting a Uniform Resource Locator "URL" associated with weblog 228, hosted on weblog server 226) can view content of the conversation published on weblog 228.

Thus, weblog servers and email servers are examples of services which can interact with conversations as "automated participants," also sometimes called "robots," which communicate with conversation servers 130 in the conversation system via automated participant servers 118 (e.g., email servers 224 and weblog servers 226). As described above, these "automated participants" enable non-subscribing users to participate in a conversation without acquiring a user communications account for the conversation system. However, automated participants may also perform operations that are not directly tied to contributions of non-subscribing users, and interact with conversations in response to actions of other participants in the conversations and/or interact with conversations in response to external events. For example, services which interact with conversations as automated participants (e.g., via an automated participant server 118) may include: archival services, translation services, spell-check and/or grammar-check services, news or comment aggregation services, attachment modification services, that may be invoked to provide services to other participants (e.g., human participants) of a conversation.

In some implementations, automated participants (e.g., automated participants representing email clients 222 and weblog clients 228, etc.) can read but cannot provide content to a conversation, and thus are just observers. However, in some other implementations, authoring capabilities (the ability to provide content to a conversation) are provided to at least some automated participants (e.g., "email participants" that represent users of email clients and/or "weblog participants" that represent users of weblog clients, spell checking robots, etc.). In other words, in some implementations, at least a subset of the automated participants are treated by conversation servers 130 as full participants which have read/write/modify privileges that are substantially equal to the read/write/modify privileges of non-automated participants (e.g., human participants). It should be understood that the automated participants may interact with the conversation server using either: the same communication protocols as non-automated participants and operate as standard participants, or a special set of communication protocols that are provided specifically for special-purpose automated participants.

Automated participants with authoring capabilities may be used to provide structure for a conversation by generating structured content. Structured content can be broadly defined as content that is added, formatted or managed by an automated participant in accordance with a predefined set of logical instructions (e.g., a computer program stored in a computer readable storage medium). As one example of generating structured content, an automated participant may modify content (e.g., text, formatting, content contribution specific attachments etc.) added to a respective content contribution by non-automated participants. As another example of generating structured content, an automated participant may modify attachments of the conversation (e.g., converting image files attached to the conversation by a non-automated participant into a slideshow or displaying a video player application for displaying an attached video file). In yet another example of generating structured content, an automated participant determines relationships between numerical values in the conversation and generates a table, chart or graph and inserts the table, chart or graph into the conversation. Similarly, in some implementations, an automated participant adds new content contributions to a conversation that is structured (e.g., a table of contents or index for a conversation) without modifying content added to the conversation by a non-automated participant.

In some circumstances, a conversation will include both structured content (e.g., content that is automatically, without non-automated participant intervention, added, reformatted or otherwise managed by automated participants) and unstructured content (e.g., content added, reformatted or otherwise managed by non-automated participants). It should be understood that, as used herein, unstructured content refers to content that does not have structure generated by an automated participant. In other words, even when non-automated participants add content that is organized (e.g., charts, tables, outlines, etc.) this content is considered to be "unstructured content" because the structure is maintained by the non-automated participant(s) without intervention by automated participants. In some embodiments, a respective automated participant will only reformat content in certain portions of the conversation (e.g., structured content contributions/structured content units/structured blips), while other portions of the conversation (e.g., unstructured content contributions/unstructured content units/unstructured blips) are ignored by the respective automated participant and non-automated participants can add content to those portions of the conversation that will not be modified by the respective automated participant and thus will remain unstructured. It should be noted that even when one or more automated participants are ignoring one or more portions of a conversation, other automated participants may still modify the one or more ignored portions of the conversation (e.g., a spell-checker automated participant may check spelling of words in all content contributions of a conversation, even if a list-reformatting automated participant has been instructed to ignore one or more of the content contributions in the conversation).

In some implementations, a respective conversation includes both respective unstructured content added by a respective non-automated participant and respective structured content added by a respective automated participant where the respective structured content was generated by the respective automated participant based at least in part on additional unstructured content added by the respective non-automated participant. For example, a human participant has added a first content contribution describing a new product and a second content contribution including a development timeline for the new product, a product management automated participant converts the second content contribution including the development timeline by generating a "To Do" checklist based on the development timeline and replaces the development timeline with the "To Do" checklist, but leaves the first content contribution describing the new product without modifications. Thus, the exemplary conversation now includes both a modified second content contribution that includes structured content and an unmodified first content contribution that includes unstructured content. In another example, the product management automated participant generates and adds the "To Do" checklist to the conversation without replacing or otherwise modifying the development timeline in the second content contribution.

In some embodiments, a conversation server 130-B includes a front-end or conversation engine 246 for managing conversations and communications with clients 110. Conversation engine 246 manages communications between core components of the conversation server 130 and external components of the conversation system (e.g., other conversation servers 130, automated participant servers 118, application servers 119, etc.). In particular, in some embodiments, conversation engine 246 transmits requests/responses to and from update, access, search/query engine 260 and updates conversation database 262 (described in greater detail below with reference to FIGS. 3A-3C) and user database 270 (described in greater detail below with reference to FIG. 4) in accordance with requests/responses from other clients and/or conversation servers.

Front-end or conversation engine 246 utilizes (or, alternately includes) an update, access, search/query engine 260 to provide participant access to conversations, provide search functions in conversations, and provide search functions for server-specified searches (e.g., a search for conversations in a user's inbox or a search for a conversation associated with a particular webpage, as described in greater detail below with reference to method 1200). In some embodiments, one or more conversation indexes 264 are inverse indexes, mapping words, terms, tags, labels, participants to the conversations with which they are associated (e.g., the conversation that includes the respective word, term, tag, label, participant, etc.). The one or more conversation indexes 264 are used to find conversations in a conversation database 262 that match specified search queries. As content is added to conversations in conversation database 262 the one or more conversation indexes 264 are updated with that content so as to make the added content accessible by the execution of search queries. Conversation database 262 is described in more detail below with reference to FIG. 3.

Optionally, conversation server 130 includes an SMTP gateway 242 for facilitating email communication with one or more email servers 224. Conversation server 130-B also typically includes other modules such as one or more auxiliary services (modules, applications or servers) 250 for managing services related to conversations. In some embodiments, auxiliary services 250 include spell checking 252, language translation or localization 256, and/or managing attachments 258 to conversations. In some embodiments, conversation server 130-B also includes online presence services 248, enabling users to know the online status of other users (e.g., other subscribers of the conversation system), as described in greater detail below with reference to FIG. 6.

As described in more detail below with reference to FIG. 4, in some embodiments, conversation server 130 maintains a user database 270 that includes information indicating, for a respective user/subscriber, a list 414 (FIG. 4) of conversations in which the user/subscriber is a participant. Conversation server 130 updates the status (conversation state 438-1, FIG. 4) of each such conversation in the user's conversation list 414 when the state of the respective conversation changes. When (e.g., in response to a search/query from the user) conversation server 130 sends to the user a requested list of conversations (typically comprising a subset of the complete set of conversations in which the user is a participant), the list includes status information for the listed conversations. The status information in the returned list is generally a subset of the conversation state 438, as only a portion of the conversation state (e.g., whether there is any content in the conversation that has not yet been viewed by the user) is needed when displaying the list of conversations.

In the discussion below, a subscriber is a user for whom a conversation server 130 (e.g., any conversation server 130 in a set of conversation servers 130 that provide conversation services) maintains a user record or profile (see 402, FIG. 4, as described below).

Figure 3A:
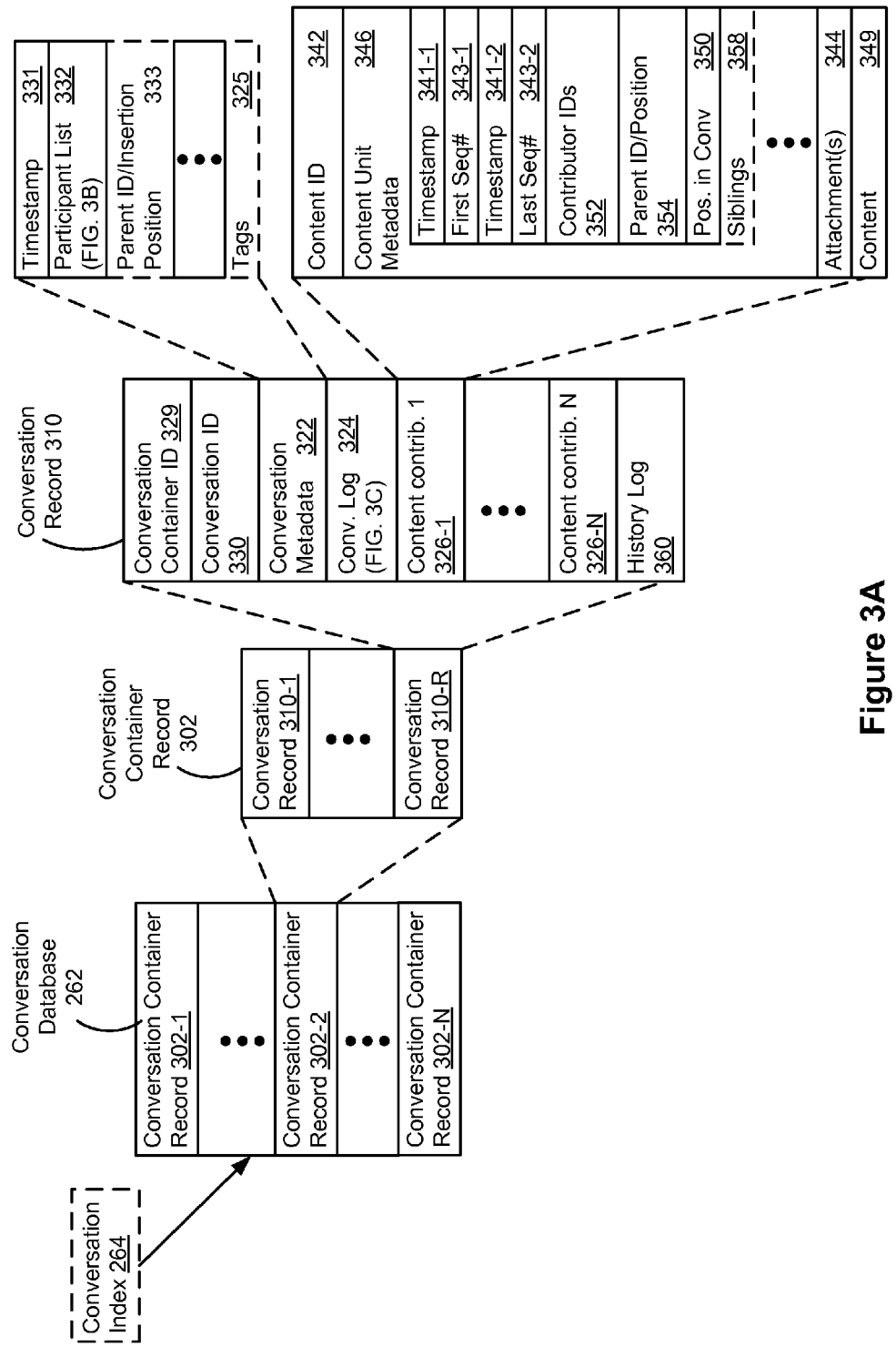
FIGS. 3A-3C are block diagrams of data structures for a conversation database, a participant list and a conversation log, respectively, according to certain embodiments.

FIG. 3A is a block diagram illustrating exemplary data structures for conversation database 262. While most conversations have a single set of participants that share all the content of the conversation, some conversations, herein called conversation containers, have a more complicated structure. In particular, a first conversation can result in any number of "side conversations" by various subsets of the participants in the first conversation, and can even include additional participants. For example, a conversation container can be used by two or more teams of participants (e.g., Team A and Team B) to negotiate an agreement, or to co-edit a document or presentation or the like. To accommodate the needs of all the participants, an initial conversation (sometimes called the primary conversation or master conversation) is started among all the participants, and then "private conversations" are spawned off of the initial conversation to enable participants in each of the teams to communicate privately with other participants of the team, while still having access to all of the content of the initial conversation. Typically, each private conversation has a set of participants that excludes at least one participant in the primary conversation. Optionally, a private conversation can include one or more additional participants (e.g., a consultant) who is not a participant in the primary conversation. Each participant only has access to the content of the conversations in which they are a participant. Typically, the participants on Team A have access to the content of both the Team A private conversation and the primary conversation, and the participants on Team B have access to the content of both the Team B private conversation and the primary conversation.

It should be understood that in the case where a conversation container includes a single conversation, all of the participants will have access to the content of the conversation. Thus, for simple conversation systems where side conversations are not necessary, conversation containers can be restricted to containing a single conversation. In other words, in some embodiments, conversation container records 302 can be combined with conversation records 310, because each conversation container record 302 includes at most a single conversation record 310.

FIG. 3A is a block diagram of exemplary data structures that support both simple conversations (i.e., single conversations with no related private conversations) as well as conversation containers that include multiple conversations (sometimes called a primary conversation and one or more sub-conversations).

Conversation database 262 includes a plurality of conversation container records 302-1 to 302-N, each containing the data for a conversation container (e.g., data associated with the conversation(s) from a conversation container). When a respective conversation container has only one conversation, the only information in the corresponding conversation container record 302 is for the single conversation, as represented by one conversation record 310. More generally, a conversation container record 302 includes one or more conversation records 310-1 to 310-R. Each conversation record 310 contains data for a respective conversation, including:
- conversation container identifier 329, which uniquely identifies the conversation container in the conversation system that corresponds to conversation container record 302 in which conversation record 310 is located;
- conversation identifier 330, which in combination with conversation container identifier 329 uniquely identifies the conversation in the conversation system that corresponds to conversation record 310 (i.e., a conversation can only be associated with a single conversation container);
- conversation metadata 322;
- conversation log 324 (sometimes called the history log), described in greater detail below with reference to FIG. 3C; and
- one or more content contributions 326-1 to 326-n; and
- a history log 360.

Conversation metadata 322 is metadata for the conversation corresponding to conversation record 310 and identified by conversation identifier 330. In some embodiments, conversation metadata 322 includes a conversation creation timestamp 331 (indicating the date and time the conversation was created), and a list of participants 332 (described in more detail below with reference to FIG. 3B) for the conversation. Metadata 322 optionally includes other metadata, such as parent ID/Insertion Position data 333 and metadata identifying tags 325 (e.g., system and/or user assigned labels that are "public," and thus available to all participants in the conversation) associated with the conversation, and other characteristics of the respective conversation associated with conversation record 310.

When a conversation container contains more than one conversation, the participant list 332 for the primary conversation of the conversation container will typically include all the participants in all the conversations in the conversation container. However, in some embodiments, private conversations (i.e., conversations other than the primary conversation) in the conversation container can have additional participants that are not participants of the primary conversation. Thus, each of the private conversations in a conversation container will typically have a participant list 332 that includes at least one of the participants in the primary conversation of the same conversation container, and optionally includes one or more participants who are not participants in the primary conversation of the same conversation container.

In addition, when a conversation container contains more than one conversation, a parent ID/insertion position 333 is provided for each of the private conversations, but not for the primary conversation. Parent ID/insertion position 333 identifies the parent of the private conversation, as well as the position in the identified parent conversation at which content of the private conversation should be inserted when viewed by participants of the private conversation. Typically the parent of a private conversation is the primary conversation of the conversation container, but in some instances the parent of a private conversation can be another parent conversation that is higher up in the hierarchy (or graph) of conversations in the conversation container. When a participant of a private conversation views the conversation container that includes the private conversation, the content of both the parent conversation and the private conversation will be seen (assuming the participant is also a participant of the parent conversation). In the less common situation, in which a user is a participant of a private conversation, but is not a participant in the parent conversation, the user will see only the content of the conversation (or conversations) in the conversation container for which they are a participant.

In some embodiments, conversation log 324 records all changes to the conversation, including changes to the content of the conversation as well as to the set of participants and other characteristics of the conversation. Conversation log 324 is accessed when participants ask to see the state of the conversation, or a content unit of the conversation, at one or more points in time. For example, conversation log 324 can be used to reconstruct or review the sequence of edits made to a content unit of the conversation. This is sometimes called "playing back" or "playback" of the conversation. Playback of a conversation can be performed in a variety of ways, including time forward or time backward, and showing updates to just a portion of the conversation or to the entire conversation.

A respective content contribution 326 (also called a content unit, or "blip") in a conversation can be a message, much like an email message or instant message. Other content contributions 326 in a conversation can be documents (e.g., a report, meeting agenda, etc.), pictures, presentations, audio files, video files, or virtually any other type of electronic document or content. In some embodiments, there are few if any distinctions between email messages and other types of content contributions to a conversation. In some embodiments, the data in a conversation record 310 for each content contribution 326 includes:
- a content identifier 342 (e.g., a value uniquely identifying the content contribution, either globally within the conversation system, or locally within a particular conversation);
- content unit metadata 346, identifying characteristics of content contribution 326;
- optionally, one or more attachments 344 (e.g., pictures, videos, documents, files, archives, audio, animations, links, etc.); and
- content 349 (e.g., text, images, document content, etc.) of content contribution 326.

In some embodiments, content unit metadata 346 for a content unit 326 includes:
- a first timestamp 341-1 denoting the date and time the content unit was first created (added to the conversation), and a corresponding sequence number 343-1 corresponding to the state of the conversation when the content unit was first created;
- a last timestamp 341-2 denoting the last date and time that the content unit was edited, and a corresponding sequence number 343-2 corresponding to the state of the conversation when the last edit to the content unit was made; having both the first and last timestamps and sequence numbers is useful (for example) when playing back changes to the content unit, or when playing back changes to a portion of the conversation that includes the content unit or displaying a participant specific markup that indicates the changes to a conversation since the last time that a participant viewed the conversation; and
- contributor identifiers 352 (e.g., participant addresses) of the content unit's contributors or author(s), optionally ordered by the order of first contributions of each author to the content unit; it should be understood that while most content units have a single author, content units can be written collaboratively, in which case they have multiple authors.

In some embodiments, metadata 346 for a content unit 326 also includes one or more of the following:

parent identifier 354 provides an identifier of or pointer to the parent content unit to which this content contribution is a response or reply;

position 350 provides an indicator of the position of this content unit in a conversation); position 350 may be used to govern how the content unit is displayed when displaying two or more content units of the conversation; and optionally, siblings 358 of this content contribution (i.e., identifiers or pointers to sibling content units, which are other responses or replies to the parent of this content unit).

Typically, metadata 346 for a content unit 326 includes at least one value (e.g., position 350 or parent identifier 354) that identifies or represents the position of the content unit 326 in the conversation.

A conversation index 264 enables fast access to conversations in the conversation database 262 through searches of the index by update, access, search/query engine 260 (FIG. 2).

Figure 3B:
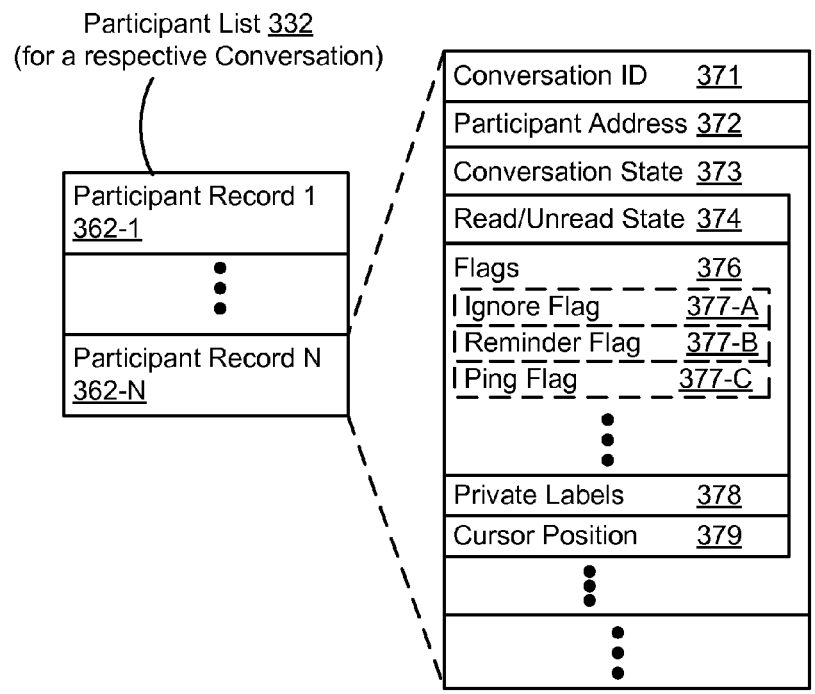

FIG. 3B is a block diagram illustrating data structures for participant list 332 in conversation metadata 322 (FIG. 3A) of a conversation record 310. A participant list 332 includes a plurality of participant records 362, one for each participant in a respective conversation. In some embodiments, each participant record 362 includes the following information, or a subset of the following information:

a conversation identifier 371;

a participant address 372, which may also be called a participant identifier; the participant address uniquely identifies the participant among all the participants in conversations in the conversation system;

a per-user conversation state 373; for example, conversation state 373 may indicate read/unread state 374 of this conversation with regard to the respective participant corresponding to participant record 362; conversation state 372 optionally includes information about which content contributions in the conversation have been viewed by the participant, and which have not yet been viewed;

conversation state 373 for a conversation participant may include flags 376; optionally, flags 376 may include an ignore flag 377-A (also sometimes called the mute flag), which if present, indicates that the participant has instructed the conversation system not to notify the participant of updates to the conversation, a reminder flag 377-B and a ping flag 377-C;

conversation state 373 for a conversation participant may also include private labels (sometimes called "folders" or "folder designations") 378 assigned by this participant to this conversation, which are for use only by this participant (e.g., when searching for conversations, the participant can include a private label as one of the query terms); private labels can be applied by participants to help organize their conversations and to make it easy to locate conversations based, in part, on what labels have been applied to them; it is noted that tags 325 are public information, available to all participants in a conversation, while the private labels of each participant are private to that participant; conversation state 373 for a conversation participant may also include a cursor position 379, which indicates either the portion of the conversation currently being viewed by the participant (and the position of the user's cursor within a respective content unit if the user is entering or editing a content unit), or the portion of the conversation last viewed by the participant if the participant is not currently displaying or viewing the conversation;

optionally, other metadata related to this respective participant with respect to this particular conversation.

Another optional flag in per-user conversation state 373 for a respective participant is a reminder flag 377-B. Per-user conversation state 373 also includes a corresponding timestamp indicating the date and time (or pair of timestamps to indicate a range of dates/times) at which to reminder the participant to pay attention to the conversation or a portion thereof, optionally a user ID identifying the user who initiated the reminder (in some embodiments, reminders can be sent by a user not only to themselves, but to other participant(s) in the conversation), and optionally a content range indicator for specifying a portion of the conversation that is the subject of the reminder.

Another optional flag in per-user conversation state 373 for a respective participant is a ping flag 377-C. A ping flag is included in per-user conversation state 373 when another participant has sent a ping (which is a form of notification, or instant message) to the participant (typically an online participant), or when the participant has sent a ping to another participant. The ping flag, when present, indicates to the client application that a ping notification (e.g., a pop-up box) is to be displayed.

Much of the information (e.g., conversation state 373) in each participant record 362 is private to that participant and is not shared with other participants of the conversation or other users in the conversation system. In some embodiments, the cursor position 379 of each participant who is actively editing a content unit or entering new text in a conversation is published to and visible to other participants of the conversation, unless a respective participant has elected to suppress publication of their cursor position, in which case that aspect of the participant's conversation state 373 is not considered to be private to the participant. When there are a plurality of active participants who are editing the same conversation, cursor position information for each of the active participants is transmitted to the clients of the active participants (via their hosting conversation servers). At the client of a respective participant, a plurality of cursor positions (corresponding to a plurality of different participants) are concurrently displayed when the cursor positions are sufficiently close to each other to enable concurrent display.

As described above, in some embodiments, for each respective conversation record 310, conversation server 130 maintains for each respective participant 362 a conversation state 373 of the respective conversation in regard to the respective participant. Conversation server 130 provides to the respective participant (e.g., to a client that is displaying the conversation to the participant) the state of the respective conversation in regard to the respective participant. In some embodiments, this includes providing to the participant (e.g., to the client being used by the participant) the read status of the content units of the respective conversation in regard to the participant (i.e., indicating which content units have already been read or viewed (in their current state) by the participant, and which have not). In some embodiments, providing conversation state 373 of the respective conversation in regard to the respective participant includes private labels 378, specified by the respective participant for the respective conversation.

In some embodiments, providing state 373 of the respective conversation in regard to the respective participant includes providing, in accordance with instructions from the participant, metadata (e.g., ignore flag 377-A) to ignore the respective conversation. This provides a participant with an option to manage conversations in accordance with a rule, in effect to archive conversations, and to reduce congestion in a conversation viewer. For example, when a participant marks a conversation with a system defined label of "ignore" or "mute," ignore status flag 377-A for the participant (for the marked conversation) is set, and the conversation is thereafter treated (on behalf of this particular participant) much like an archived message or conversation. Other participants of the conversation may continue to see the conversation in their list of active conversations if they have not marked the conversation with the "ignore" label.

In some embodiments, the per-user conversation state 373 for each participant of each conversation is stored in conversation database 262, as shown in FIGS. 3A-3B. In other embodiments, the per-user conversation state 373 for each participant of each conversation is stored in user database 270, discussed in greater detail below with reference to FIG. 4. In yet other embodiments, per-user conversation state 373 information (for each participant of each conversation) is stored in a separate database or server (sometimes called the "user supplement" database or server) that is separate from conversation database 262 and user database 270. Optionally, pointers to per-user conversation state 373 information (e.g., record) in the user supplement database may be stored in both user database 270 and conversation database 262. Alternately, such pointers are not stored, and the per-user conversation state 373 for a particular user of a respective conversation is retrieved, typically for transmission to a client participating in the conversation, from the user supplement database on an as-needed basis and is updated in accordance with operations (e.g., reading content, entering end content, editing content, etc.) performed by the participant.

As described in more detail below, in some embodiments, conversation server 130 stores, for each respective subscriber, a contact list (416, described in FIG. 4) associated with the respective subscriber. In some embodiments, the contact list is stored in a user database 270 (in FIGS. 2 and 4).

When a conversation is sent to a client (e.g., 110-B in FIG. 2) for display to a user, the client receives only a portion of the conversation record 310 (FIG. 3A) for the conversation. For example, in some embodiments, the portion of conversation record 310 sent to and stored at the client excludes conversation log 324, and conversation state 373 of other participants (except, the cursor position of other currently active participants in the conversation who have not blocked the transmission of their cursor position). In some embodiments, conversation log 324 is sent to a client only when the participant at that client has requested playback of the conversation, or a user-specified portion of the conversation, or has requested to view the state of the conversation at a particular time or point in the past. It should be understood that sending only the portion of conversation record 310 that is relevant to the user to the client associated with the user is advantageous in some embodiments, because it reduces network bandwidth usage and the storage space required at the client.

Figure 3C:
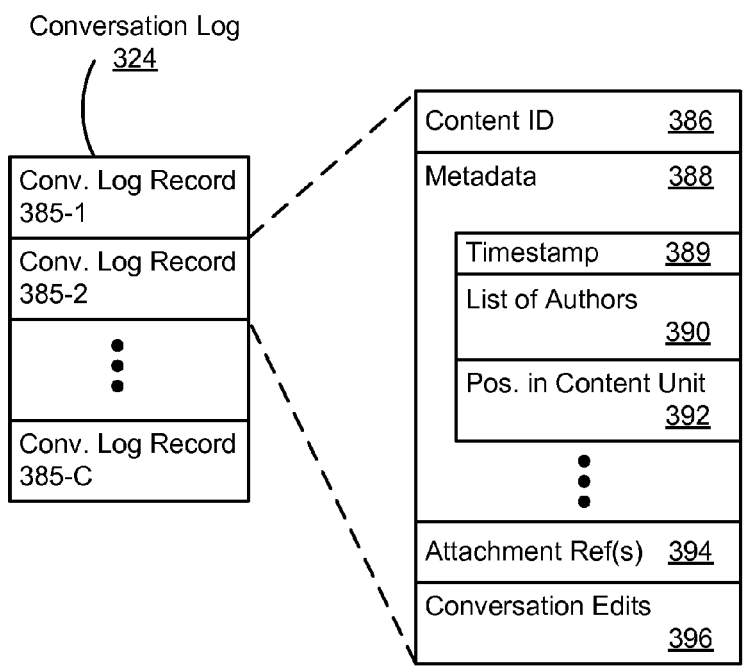

FIG. 3C is a block diagram illustrating data structures for conversation log 324, according to some embodiments. As shown in FIG. 3C, conversation log 324 includes a time ordered sequence of log records 385-1 to 385-C (sometimes called log entries). A respective log record 385 includes a content ID 386, identifying the content unit (if any) updated by the conversation edits recorded in log record 385, metadata 388 relevant to the conversation edits recorded in log record 385, references 394 (e.g., one or more pointers or file names) to any attachments added to the conversation by the conversation edits recorded in the log record, and a list of the conversation edits or changes 396 recorded in log record 385. Metadata 388 includes a timestamp 389 and/or sequence number that uniquely identifies the order of the conversation edits in log record 385, relative to the conversation edits in other log records for the same conversation. Metadata 388 also identifies a list of authors (also called contributors) 390 of the conversation edits in log record 385, and the starting position 392 of the conversation edits recorded in log record 385. While the authors list 390 will contain only one author for most log records 385, when multiple authors make edits or contribute content to a content unit during a short period of time, or during overlapping time periods, a single corresponding log record 385 includes a list 390 of all of the authors who contributed to the change in the content unit recorded by that log record 385. In some embodiments, starting position 392 is incorporated into conversation edits 396, as an offset or position setting for the first edit or update operation of conversation edits 396, and in those embodiments the log records do not have a separate starting position 392 field.

Figure 4:
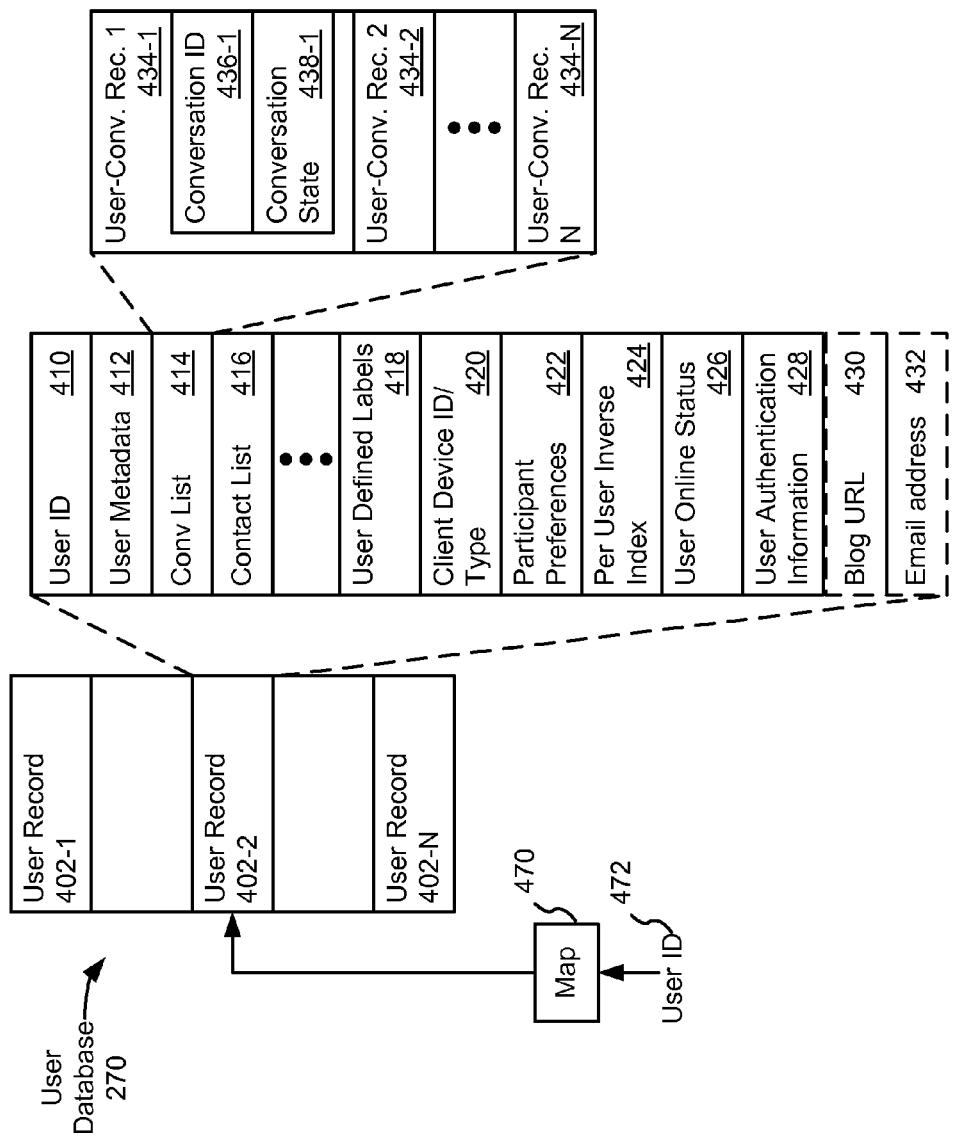
FIG. 4 is a block diagram illustrating a data structure for a user database, according to certain embodiments.

FIG. 4 is a block diagram illustrating a data structure for a user database 270, according to certain embodiments. Database 270 includes a plurality of user records 402. In some embodiments, each user record 402 includes:

- a user identifier 410 for a subscriber of the conversation system;
- user metadata 412, containing information about or for the user;
- a list of conversations 414 in which the user is a participant;
- the user's contact list 416 (typically a list of contacts 416 that corresponds to and is personal to user);
- optionally, labels 418 defined by the user for labeling or classifying conversations;
- optionally, a client device identifier and/or type 420 of a client device being used by the user to communicate with conversation server 130, or alternately, the identifier and type of client devices that the user has used in conjunction with the conversation server in the past; in some embodiments, the type of the client (e.g., desktop, cell phone, etc.) may be used to determine what content from conversations is sent to the user;
- optionally, preferences 422 of the user when participating in a conversation;
- optionally, an inverse index 424 associated with the user;
- a current online status 426 of the user (e.g., offline, online, busy, away, etc.);
- authentication information 428 for the user (e.g., username, password, and optionally other values for authentication of the user);
- optionally, other data relating to the user, such as one or more blog URLs 430, email addresses 432, etc.

Conversation list 414 associated with a user includes a plurality of user-conversation records 434, each record relating to a conversation in which the user is a participant. Each user-conversation record 434 includes:

- a conversation identifier 436 that identifies the respective conversation, and
- per-user conversation state information 438, which may be the same as (or a pointer to) conversation state 373 in participant record 362 of a conversation record 310 in conversation database 262 (FIGS. 3A-3B). As discussed above, in some embodiments, per-user conversation state information is stored in a separate database or server (sometimes called the user supplement database or server), in which case user-conversation record 434 includes a conversation identifier 436, but not the per-user conversation state information 438.

As noted above, in some embodiments the conversation system includes a separate per-user inverse index 424 for each user of the conversation system; each such index 424 is an index that maps the terms, labels, tags, etc. of the conversations in which a user is participant to the conversations (and optionally, to the content units with the conversations, or locations within the conversations) containing those terms, labels, tags, etc. These per-user indices enable fast indexing and fast searching of the conversations in which a user is a participant. In some embodiments, additional indices (sometimes called "big wave" indices) are used to provide fast indexing and access to "big wave" conversations having large numbers (e.g., more than a threshold number, such as 500 or 100) of participants. In these embodiments, the content of "big wave" conversations is not indexed in the per-user inverse indices 424, and is instead indexed in one or more "big wave" indices. Similarly, in some embodiments in which groups of users participate in conversations as groups, additional per-group indices are used to index those conversations and to provide fast searching of those conversations; and the conversations (if any) in which a respective user participates only as a group member are not included in the user's per-user inverse index 424. Thus, when a user performs a search for conversations satisfying a user-specified query, multiple indices may be searched, in which case the search results from the multiple indices are merged (and optionally sorted and/or reduced) prior to returning the search results to the requesting user.

In some embodiments, conversation server 130 provides the same content of a conversation to all participants of the conversation, and provides each online participant with online presence information for the other participants in the same conversation. In some embodiments, the server allows a participant of a conversation to disable publication of their online presence information to other participants in the conversation. In some embodiments, the server allows a participant of a conversation to selectively enable publication of their online presence information to other participants in the conversation (e.g., allowing publication of the participant's online presence only to users designated by the participant; or alternately, disabling publication of the participant's online presence to users specifically designated by the participant).

In some embodiments, conversation server 130 provides the same content to each participant, formats content of the conversation to be compatible with one or more content types that a client 110 associated with a respective participant has been configured to receive, and transmits the formatted content to the client.

In some embodiments, when delivering the content of a conversation to certain clients (e.g., a cell phone or PDA), conversation server 130 formats the content by compressing multimedia data associated with the content (e.g., to reduce bandwidth requirements). In some embodiments, the server provides a subset of multimedia data associated with the content (e.g., a thumbnail image, or short audio/video clip) to the client. In some embodiments, the conversation server removes multimedia data associated with the content (e.g., strips out multimedia and just provides text) that is delivered to the client.

In some embodiments, conversation server 130 authenticates a user using authentication information 428 prior to providing content from conversations to the user.

In some embodiments, conversation server 130 sends content from conversations in which a respective user is a participant to a weblog (e.g., weblog server 226 or weblog client 228), specified (e.g., by Blog URL 430) in user record 402 for that user. When a respective participant in a conversation is an automated participant, content of the conversation is sent to the automated participant. The automated participant may represent a weblog, an email server or account, or a service provider such as a translation service, spelling checking service, or the like in the conversation.

FIGS. 5A-5E are flowcharts representing methods for hosting conversations at a server, according to certain embodiments. These methods are governed by instructions that are stored in a computer readable storage medium and that are executed by one or more processors of one or more servers. Each of the operations shown in FIGS. 5A-5E may correspond to instructions stored in a non-transitory computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

Figure 5A:
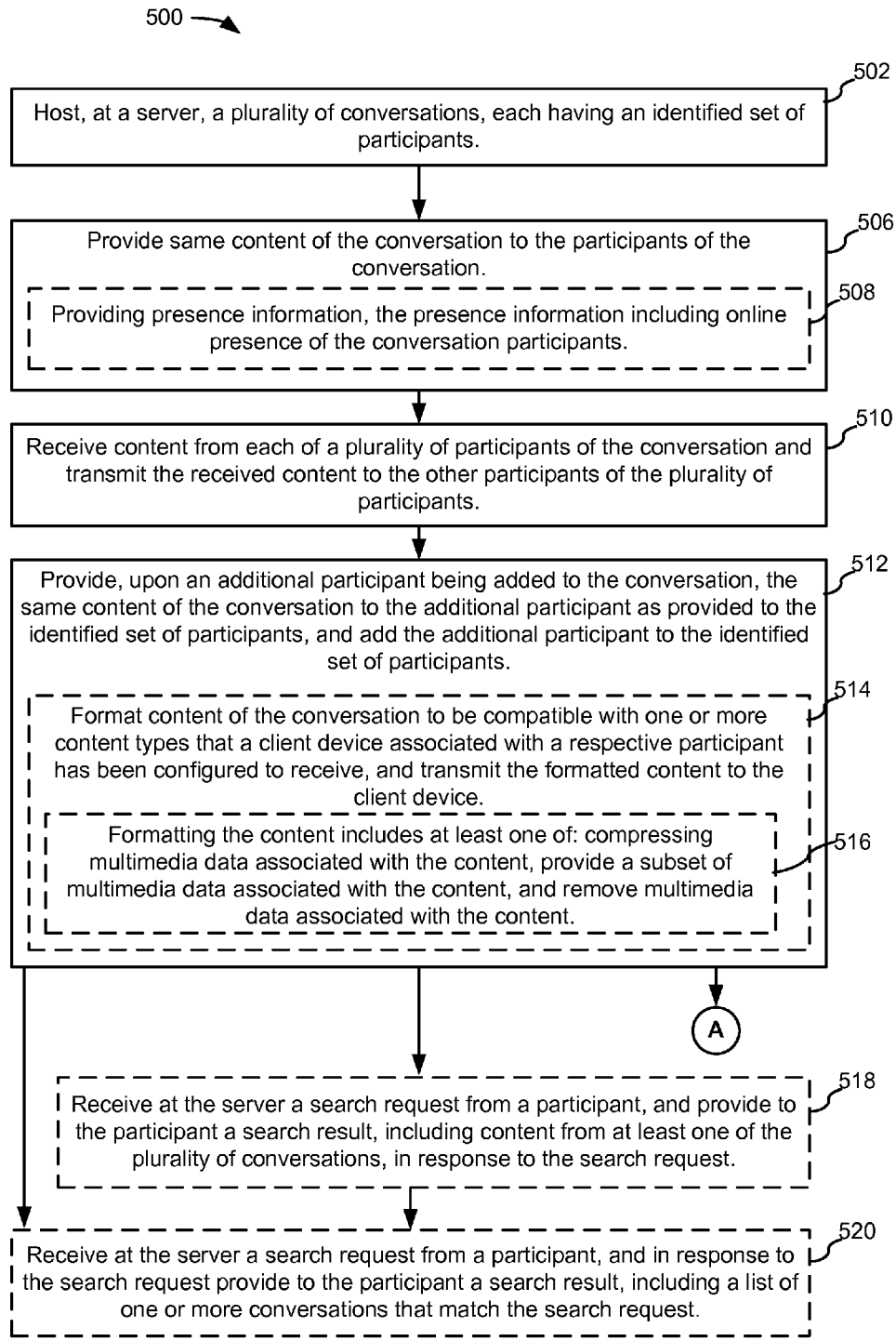
FIGS. 5A-5E are flowcharts representing a method for hosting conversations at a conversation server, according to certain embodiments.

FIG. 5A shows a method 500 for hosting conversations at a server (e.g., a conversation server 130). A server hosts (502) a plurality of conversations, each having an identified set of participants. The server is typically one of a plurality of conversation servers 130 that hosts conversations in a conversation system.

Conversation server 130 provides (506) the same content from a conversation to all the participants of the conversation. In some embodiments, the server also provides (508) online presence information of each of the plurality of participants in the conversation to other participants in the conversation. The server receives (510) content from each of a plurality of participants of the conversation and transmits the received content to the other participants of the plurality of participants.

Conversation server 130 provides (512), upon an additional participant being added to the conversation, the same content of the conversation to the additional participant as provided to the identified set of participants, and adds the additional participant to the identified set of participants. As noted above, when the additional participant is using a client (e.g., 110 in FIG. 1) capable of receiving the entire content of the conversation, the entire content of the conversation is sent to the client currently being used by the additional participant. In some embodiments, the "entire content of the conversation" includes all of the content that was added by previous participants in the conversation before the additional participant was added to the conversation as well as any automatically generated content (e.g., content generated by the server system) that was included in the conversation at the time the additional participant was added. As a result, a participant added to a conversation, even long after the conversation has begun, receives content contributed to the conversation before the participant was added to the conversation.

In some examples, participants can participate in "private conversations" (as described in greater detail above with reference to FIG. 3A); edit a draft message in "team draft mode"; opt out of automatically sharing their content (e.g., by restricting access to content added by a respective participant so that it can only be accessed by other participants that have been specifically approved by the respective participant). In some examples, participants may be restricted from the ability to add additional participants to a respective conversation without the approval of one or more other participants on the respective conversation (e.g., requiring approval of half of the other participants or all of the other participants before adding a new participant to the respective conversation).

In some embodiments, conversation server 130 formats (514) content of the conversation to be compatible with one or more content types that a client associated with a respective participant has been configured to receive, and transmits the formatted content to the client (e.g., 110 in FIG. 1). In some embodiments, conversation server 130 formats content from a conversation by performing (516) at least one of: compressing multimedia data associated with the content, providing a subset of multimedia data associated with the content, and removing multimedia data associated with the content (e.g., removing video and audio data but leaving text content).

In some embodiments, conversation server 130 receives (518) a search request (often called a query or search query) from a participant, and provides to the participant a search result, including content from at least one of the plurality of conversations, in response to the search request. Alternately, or in addition, in response to the received search request the server provides (520) to the participant a search result that includes a list of one or more conversations that match the search request. In some embodiments, the search request is processed by search/query engine 260 (FIG. 2), using an inverse index 264 of conversation content to identify conversations, or content within one or more conversations, that match the search request.

Figure 5B:
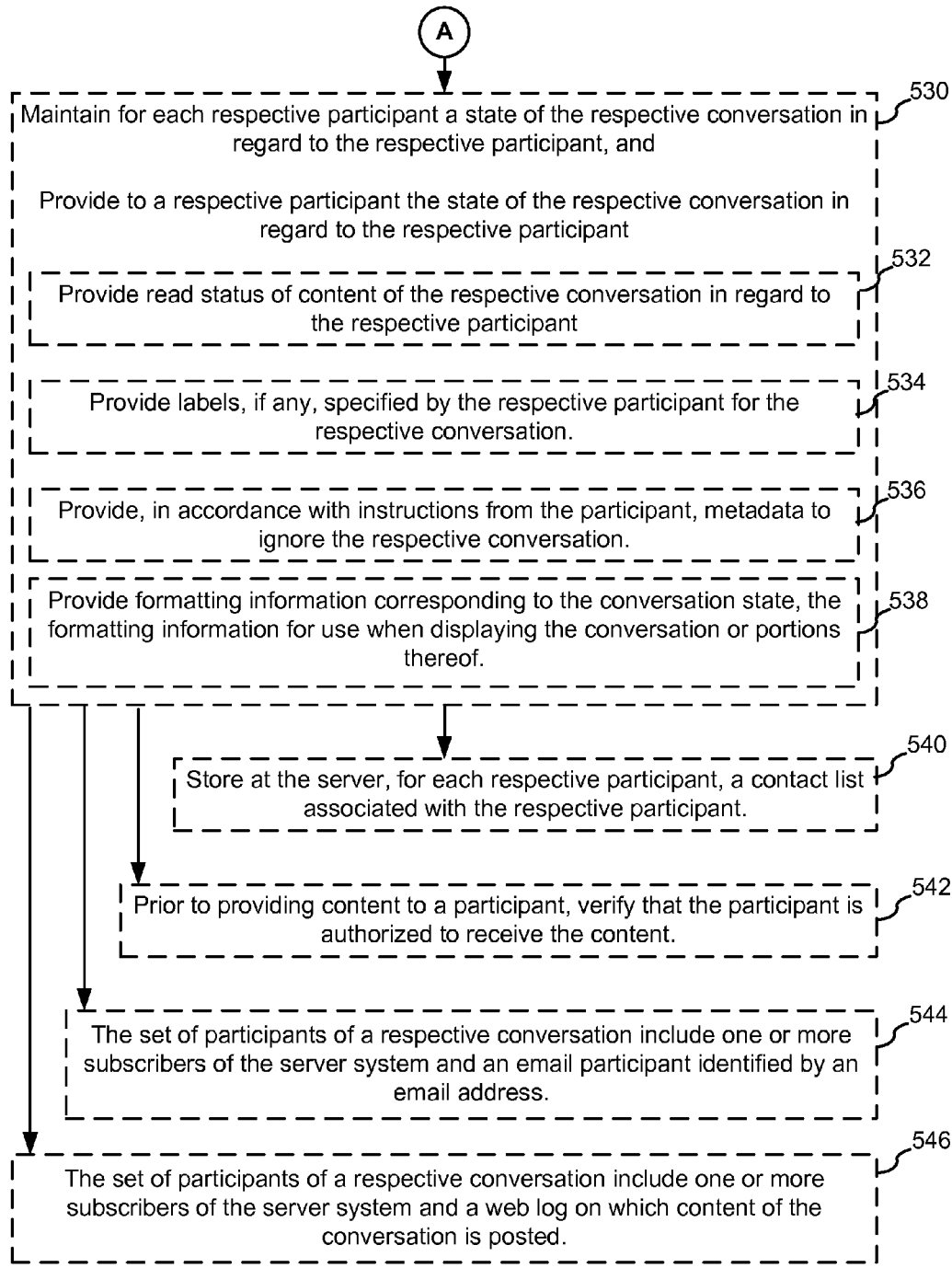

FIG. 5B shows a continuation of method 500 of FIG. 5A. A server maintains (530) for each respective participant a state of the respective conversation in regard to the respective participant, and provides to the respective participant (e.g., to the client currently being used by the participant to view the conversation) the state of the respective conversation in regard to the respective participant. In some embodiments, this includes providing (532) to the participant (e.g., to the client being used by the participant) the read status of the content units of the respective conversation in regard to the participant (i.e., indicating which content units have already been read or viewed by the participant, and which have not). In some embodiments, providing the state of the respective conversation in regard to the respective participant includes providing (534) labels, if any, specified by the respective participant for the respective conversation.

In some embodiments, the metadata maintained for a conversation with respect to a particular participant includes (536) metadata (e.g., ignore flag 377-A in FIG. 3B) to ignore the respective conversation, in accordance with instructions from the participant. For example, the ignore metadata may be provided to search engine 260 (FIG. 2) of conversation server 130. In some embodiments, conversation server 130 provides (538) formatting information corresponding to the conversation state, the formatting information for use when displaying the conversation or portions thereof. In some embodiments, the formatting information includes one or more of: color (e.g., of text, background, borders), font, indenting, position (e.g., superscript or subscript), etc.

In some embodiments, conversation server 130 stores (540), for each respective participant, a contact list associated with the respective participant. In some embodiments, the server verifies (542) (using authentication information 428) that the participant is authorized to receive the content of a conversation, prior to providing content to a participant.

In some embodiments, conversation server 130 maintains (544) a set of participants of a respective conversation, including one or more subscribers of the conversation system and an email participant identified by an email address. In some embodiments, conversation server 130 maintains (546) a set of participants of a respective conversation, including one or more subscribers of the conversation system and a weblog on which content of the conversation is posted.

Figure 5C:
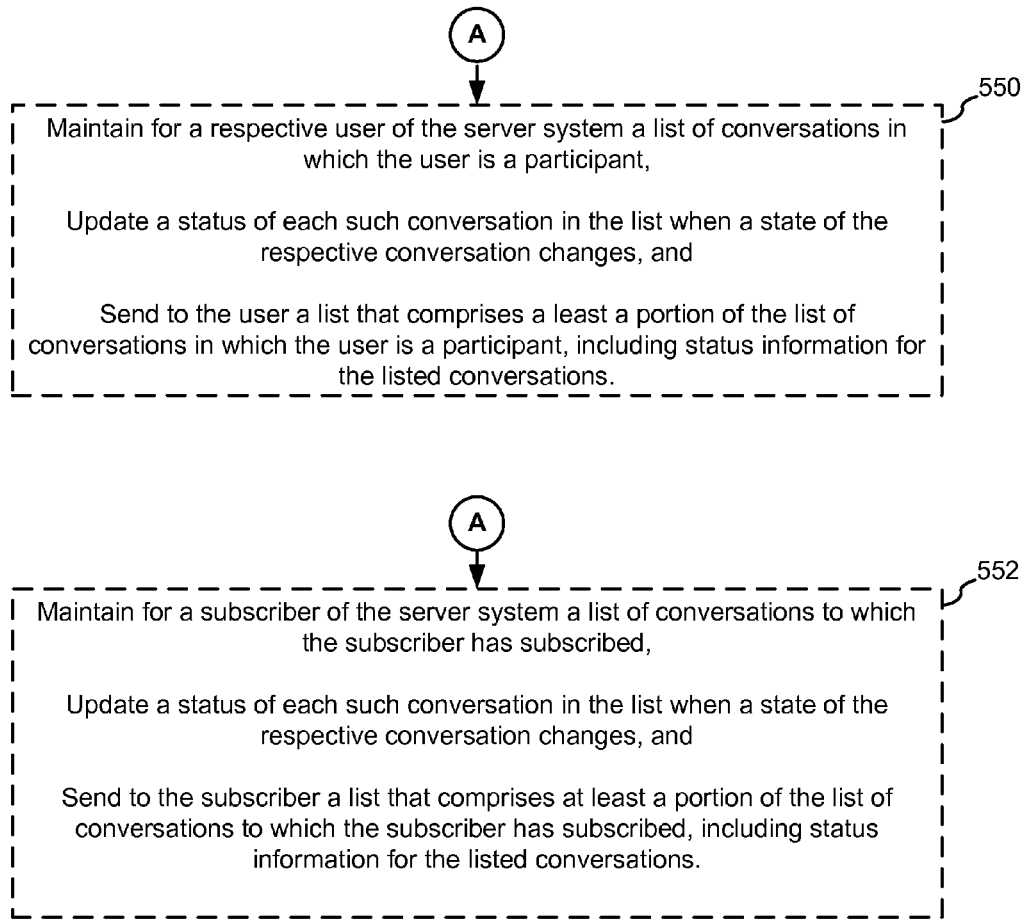

FIG. 5C shows a continuation of method 500 of FIG. 5A. In some embodiments, conversation server 130 maintains (550) for a respective user (of the conversation system hosted by a set of servers that includes conversation server 130) a list of conversations in which the user is a participant. Conversation server 130 updates a status of each such conversation in the list when a state of the respective conversation changes. Upon request from the user (e.g., from a client being used by the user) the server sends to the user a list comprising at least a portion of the list of conversations in which the user is a participant, the list including status information for the listed conversations. In some embodiments, each respective user for which conversation server 130 maintains (552) a list of conversations is a subscriber of the conversation system. Conversation server 130 updates a status of each such conversation in the list when a state of the respective conversation changes. Upon request from the user (e.g., from a client being used by the user) conversation server 130 sends, to the subscriber a list that comprises at least a portion of the list of conversations to which the subscriber has subscribed, including status information for the listed conversations.

Figure 5D:
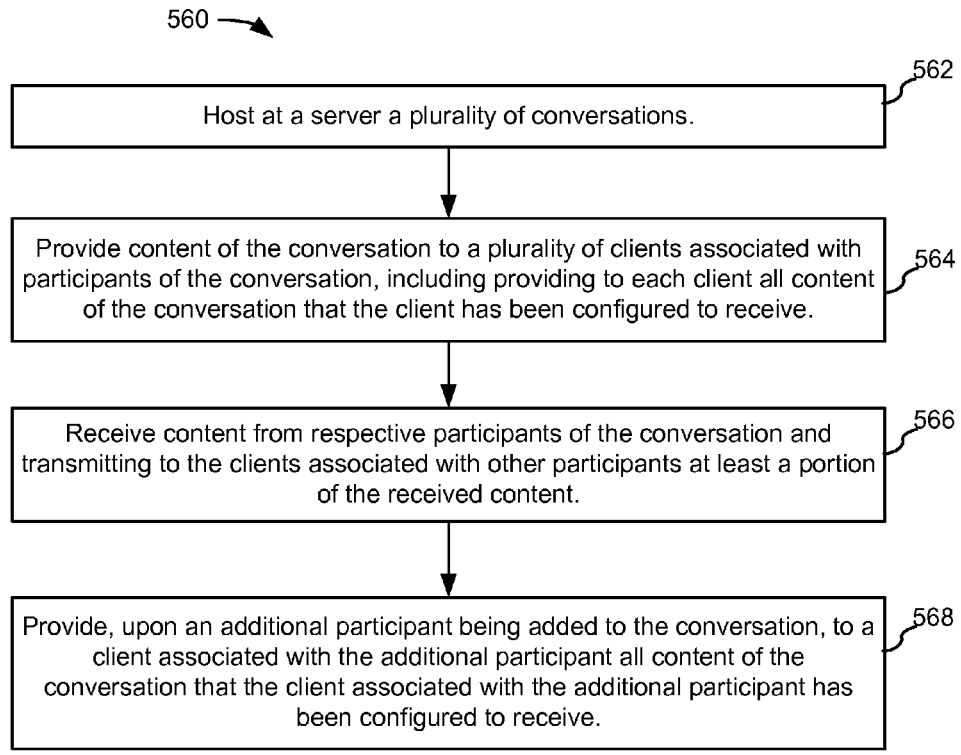

FIG. 5D shows a method 560 of hosting electronic messages. A server hosts (562) a plurality of conversations. Conversation server 130 provides (564) content of the conversation to a plurality of clients (e.g., 110 in FIG. 1) associated with participants of the conversation, including providing to each client all content of the conversation that the client has been configured to receive.

Conversation server 130 receives (566) content from respective participants of the conversation and transmits to the clients associated with other participants of the conversation at least a portion of the received content. Conversation server 130 also provides (568), upon an additional participant being added to the conversation, to a client associated with the additional participant all content of the conversation that the client associated with the additional participant has been configured to receive.

Figure 5E:
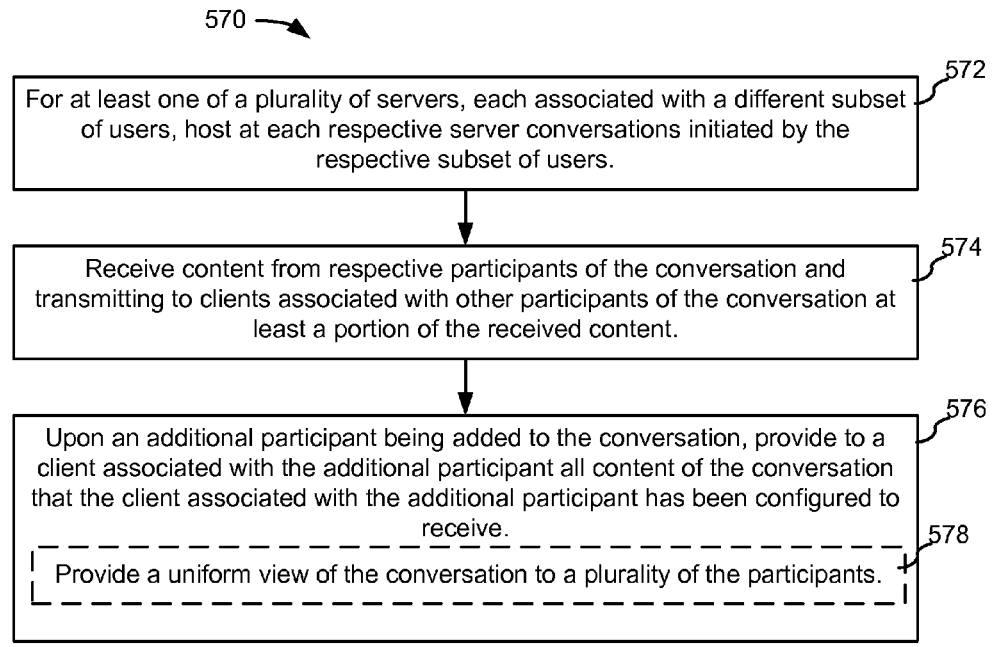

FIG. 5E shows a method 570 of hosting electronic messages. For at least one of a plurality of servers, each associated with a different subset of users, a server hosts (572) conversations initiated by the respective subset of users. Conversation server 130 receives (574) content from respective participants of the conversation and makes the content available to other participants of the conversation. For participants associated with other conversation servers, the content is transmitted to those other conversation servers. The content is transmitted to the participants when they log in and request the content of the conversation.

Conversation server 130 also provides (576), upon an additional participant being added to the conversation, all the content of the conversation to a client associated with the additional participant, or alternately, all content of the conversation that the client associated with the additional participant has been configured to receive. In some embodiments, conversation server 130 provides (578) a uniform view of the conversation to a plurality of the participants.

Figure 6:
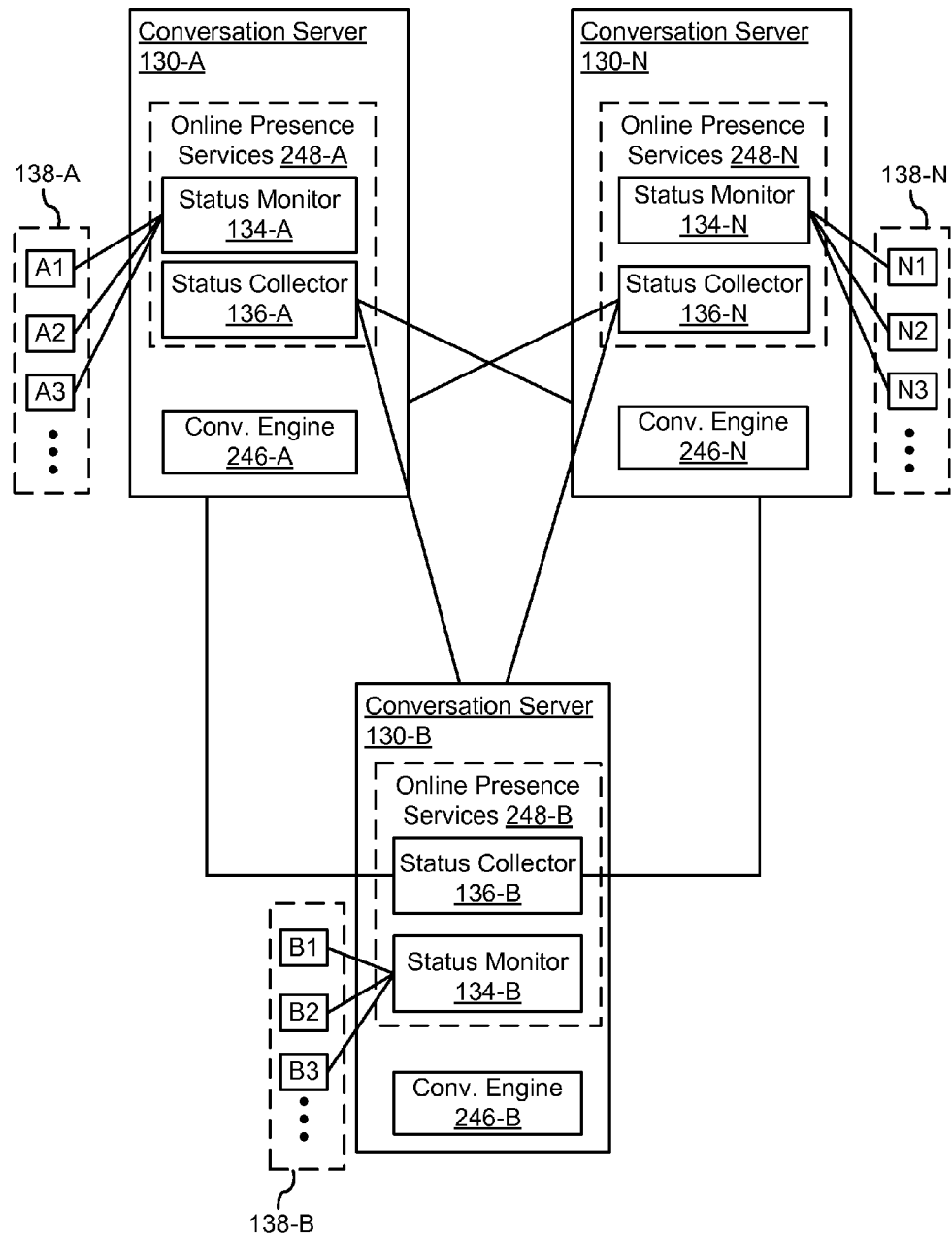
FIG. 6 is a block diagram of a plurality of linked conversation servers, with mechanisms for obtaining and distributing user online presence information, according to certain embodiments.

FIG. 6 is a block diagram illustrating an embodiment of a conversation system having a plurality of linked conversation servers 130, according to certain embodiments. FIG. 6 illustrates a logical coupling of conversation servers 130 to each other and to clients for monitoring and reporting the online status (presence) of the system's participants. While the exemplary conversation system illustrated in FIG. 6 includes three conversation servers 130-A, 130-B, and 130-N, it should be understood that the conversation system may include more or fewer conversation servers. Each conversation server 130 hosts conversations for a set 138 of participants (e.g., 112 in FIG. 1). For example, each conversation server 130 may host conversations initiated by hundreds or even thousands of participants. Conversation server 130-A is assigned a first set 138-A of participants; conversation server 130-B is assigned a second set 138-B of participants; and conversation server 130-N is assigned a third set 138-N of participants. Each conversation server 130 includes online presence services 248 (e.g., 248-A, 248-B, and 248-N), including a respective status monitor 134 (134-A, 134-B, 134-N) and a respective status collector 136 (136-A, 136-B, 136-N) which provide online presence information to a conversation engine 246 (246-A, 246-B, 246-N).

Whenever a participant changes online status (e.g., goes from offline to online, by logging into the conversation system), the change in status is detected by a respective status monitor 134 (e.g., a status monitor in the conversation server assigned to the participant). A status monitor 134 at the conversation server to which the participant is assigned receives a message or otherwise detects the change in online status of that participant to "online" (or "active," "busy," or whatever status is appropriate). Furthermore, a status collector 136 at the conversation server gathers the online status of the contacts in that participant's contact list 416. While some of the contacts in the participant's contact list may be assigned to the same conversation server, other contacts in the participant's contact list are assigned to other conversation servers.

The status collector 136 of the conversation server to which the participant is assigned gathers the online status of the participant's contacts, including those assigned to other conversation servers, and forwards at least a portion of the collected status information to the participant (i.e., to the client or system currently being used by the participant). In some embodiments, the status collector broadcasts requests for status information of the participant's contacts to the other conversation servers, and the conversation servers to which the contacts are assigned respond to the requests. In some other embodiments, the status collector determines the conversation servers to which the contacts are assigned and sends requests for status information to those conversation servers. In some embodiments, the assignments of participants to conversation servers may be determined by reference to an index of all participants, a copy of which may be stored in all of the conversation servers or a subset thereof.

For example, if a participant A1 of the first set 138-A of participants, assigned to conversation server 130-A, changes online status from offline to online, a client application at the client being used by the participant A1 sends a message to the conversation server 130-A with which participant A1 is associated announcing that participant A1 is online. Status monitor 134-A at conversation server 130-A receives the message and updates the status of the participant A1 to online. Status monitors 134 of other conversation servers either do not receive this message, or ignore it because the participant A1 is not assigned to those other conversation servers. Status collector 136-A at Conversation server 130-A obtains a list of the contacts for the participant A1 (e.g., by accessing contact list 416 for participant A1). Using that list of contacts, status collector 136-A gathers status information from the conversation servers to which the contacts are assigned. Thus, if a contact is assigned to conversation server 130-A, then status collector 136-A accesses the contact's status information stored at conversation server 130-A. If a respective contact is assigned to conversation server 130-B, then conversation server 130-A communicates with conversation server 130-B to get the status information for the respective contact. A similar procedure occurs if a respective contact is assigned to conversation server 130-C.

Figure 7:
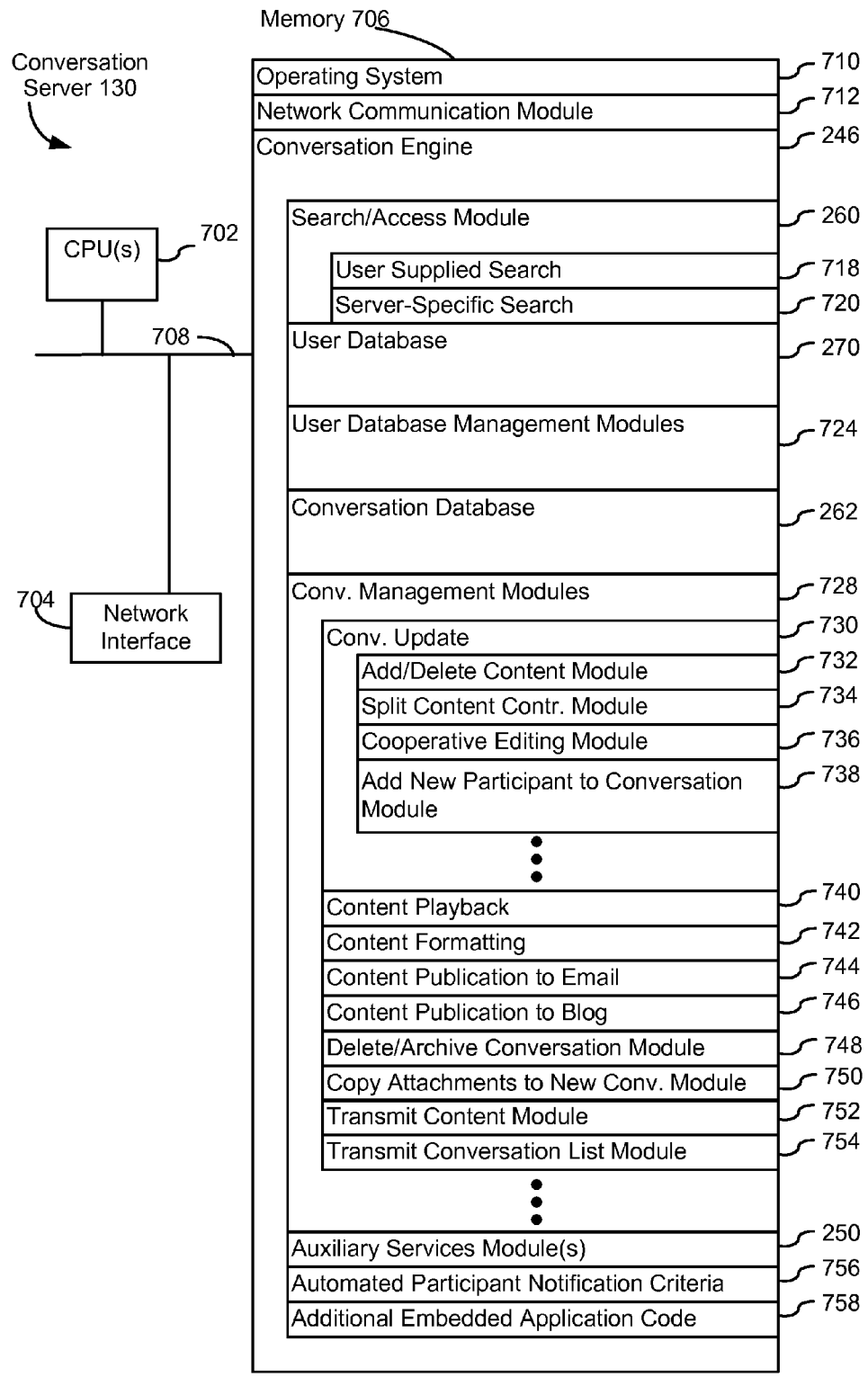
FIG. 7 is a block diagram of a conversation server for a conversation system, according to certain embodiments.

FIG. 7 is a block diagram illustrating a conversation server 130 in accordance with one embodiment. Conversation server 130 is a computer system including one or more processing units (CPUs) 702, one or more network or other communications interfaces 704, memory 706, and one or more communication buses 708 for interconnecting these components. Communication buses 708 may include circuitry (sometimes called a chipset) that interconnects and controls communications between system components. Conversation server 130 typically does not include a user interface, but in some embodiments conversation server 130 does include a user interface having a display device and a keyboard.

Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 optionally includes one or more storage devices remotely located from the CPU(s) 702. Memory 706, or alternately the non-volatile memory device(s) within memory 706, includes a non-transitory computer readable storage medium. In some embodiments, memory 706 or the computer readable storage medium of memory 706 stores the following programs, modules and data structures, or a subset thereof:

- an operating system 710 that includes procedures for handling various basic system services and for performing hardware dependent tasks;
- a network communication module 712 that is used for connecting conversation server 130 to other computers via the one or more communication network interfaces 704 and one or more communication networks, such as the Internet, other wide area networks, local area networks, metropolitan area networks, and so on; and
- a conversation engine 246 that provides hosted conversation services on conversation server 130 for a plurality of users.

Conversation engine 246 may include the following modules, or a subset thereof:

- a search/access module 260, for performing searches of conversation database 262; the searches of conversation database 262 may include user-specified searches 718 as well as server-specified searches 720 (e.g., a search for conversations in a user's inbox);
- a user database 270, for storing information pertaining to users of the conversation system;
- user database management modules 724, for managing user database 270 (e.g., for creating new user records, and for updating existing user records);
- conversation database 262;
- conversation management modules 728, for managing conversation database 262; and
- auxiliary services module(s) 250; as noted above, each particular auxiliary service provided in a conversation system may be provided by modules within a conversation server 130, or by other servers.

In some embodiments, conversation management modules 728 include the following modules, or a subset thereof:

- a set of conversation update modules 730, for updating a conversation with changes made by one or more participants, including one or more of: an add/delete content module 732, for adding or removing content from a conversation; a split content contribution module 734, for splitting a content contribution (e.g., 326 in FIG. 3A) in a conversation into two or more separate content contributions; a cooperative editing module 736, for enabling simultaneous editing of a conversation or a content contribution (unit of content) by a plurality of participants; and an add new participant to conversation module 738, for adding a new participant to a conversation;

content playback module 740, for playing back edits to a conversation or document (or a user-specified portion of the conversation or document);

content formatting module 742, for formatting content to match a configuration of a client; (the configuration of a client for a respective user may be specified by an client device ID/type 420, FIG. 4, of the user record 402 for the respective user);

content publication to email module 744, for publishing content of a conversation to an email address; the email address may be specified by an email address 432, FIG. 4, of the user record 402 for the respective user;

content publication to weblog ("blog") module 746 for publishing content of a conversation to a weblog; the URL or network location of the weblog may be specified by blog URL 430, FIG. 4, of the user record 402 for the respective user)

delete/archive conversation module 748, for deleting or archiving a conversation from a user's inbox or conversation viewer;

copy attachments to new conversation module 750, for copying attachments from one conversation to another conversation, without copying other content of the conversation;

transmit conversation module 752, for transmitting content of a conversation to a client or to another conversation server (e.g., for delivery to a user/client serviced by the other conversation server);

transmit conversation list module 754, for transmitting a list of conversations to a client or to another conversation server (e.g., for delivery to a user/client serviced by the other conversation server);

automated participant notification criteria 756 indicating what events are to be reported to one or more automated participants (e.g., a transient table including notification criteria indicating the conditions under which an event such as the modification, creation, deletion of a conversation should be reported to one or more automated participants), and what information is to be provided in the notification (e.g., a notification that content has changed, a copy of the entire conversation or a pre-defined portion of the conversation, such as a modified content contribution, a parent of the modified content contribution, siblings of the modified content contribution and/or children of the modified content contribution, etc.); and additional embedded application code 758 (e.g., application boilerplate) which is, optionally, provided to clients in conjunction with embedded application code received from one or more application servers so as to enable the embedded application to run within the conversation.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 706 may store a subset of the modules and data structures identified above. Furthermore, memory 706 may store additional modules and data structures not described above.

Although FIG. 7 shows a conversation server, FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a conversation server system and how features are allocated among them will vary from one implementation to another, and may depend in part on the amount of data traffic that the system must handle during peak usage periods as well as during average usage periods.

Figure 8:
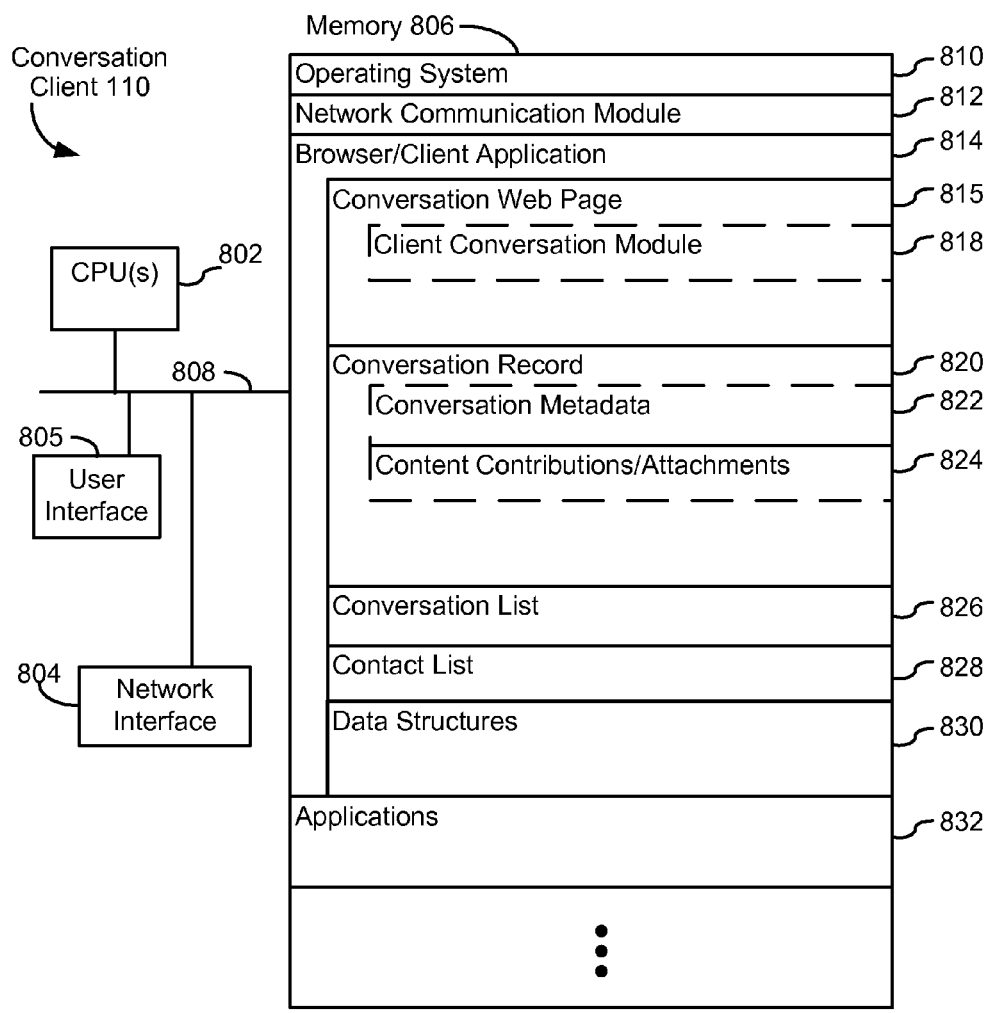
FIG. 8 is a block diagram of a client having a user who participates in one or more conversations in a conversation system, according to certain embodiments.

FIG. 8 is a block diagram of a client having a user who participates in one or more conversations in a conversation system, according to certain embodiments. Client 110 is a computer system or device including one or more processing units (CPUs) 802, one or more network or other communications interfaces 804, memory 806, and one or more communication buses 808 for interconnecting these components. Communication buses 808 may include circuitry (sometimes called a chipset) that interconnects and controls communications between system components. Client 110 typically includes a user interface 805. In some embodiments, the user interface includes a display device, a keyboard and a pointer device (not shown), while in other embodiments (e.g., a cell phone or personal digital assistant) the user interface includes a touch screen display.

Memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 optionally includes one or more storage devices remotely located from the CPU(s) 802. Memory 806, or alternately the non-volatile memory device(s) within memory 806, includes a non-transitory computer readable storage medium. In some embodiments, memory 806 or the computer readable storage medium of memory 806 stores the following programs, modules and data structures, or a subset thereof:

- an operating system 810 that includes procedures for handling various basic system services and for performing hardware dependent tasks;
- a network communication module 812 that is used for connecting the client 110 to other computers via the one or more communication network interfaces 804 and one or more communication networks, such as the Internet, other wide area networks, local area networks, metropolitan area networks, and so on;
- a browser or other client application 814 for viewing and interacting with web pages and other content, including conversations in a conversation system;
- optionally, a conversation web page 815, which is received from a conversation server (e.g., shown in FIG. 7) and is displayed using the browser or other client application 814 (e.g., a web-based conversation application for viewing conversations associated with a particular communications account within a webpage of a web browser);
- optionally, a conversation record 820, which contains the content of a conversation downloaded from a conversation server, some or all of which may be displayed in the conversation web page 815;

optionally, a conversation list 826, which is a list of conversations downloaded from a conversation server (e.g., in response to a query from a user of the client or as part of a user interface displayed within conversation web page 815);

optionally, a contact list 828, or a portion of the contact list of the user of the client; the contact list may be maintained separately from or in conjunction with a conversation system;

optionally, other data structures 830 (e.g., a list of labels defined by the user); and optionally, other applications 832 for execution by client 110 (e.g., a stand-alone conversation application for viewing conversations associated with one or more communications accounts of a user of the client).

In some embodiments, the conversation web page 815 includes a client conversation module 818 or other client assistant that is embedded in web page 815. Client conversation module 818 comprises executable instructions that are executed by client 110; for example, client conversation module 818 may include instructions that are executed by a virtual machine (e.g., a Java virtual machine) that is part of browser 814. Conversation web page 815 includes a conversation user interface having icons, which when activated by a user, execute various tasks to enable a user to request a list of conversations, select a conversation for display, view various portions of a conversation, participate in the conversation (e.g., by adding content to or editing content of the conversation), start new conversations, download attachments, and so on. Icons in the conversation user interface may function as links to executable procedures and instructions in client conversation module 818. The aforementioned conversation record 820 and conversation list 826 may, in some embodiments, be downloaded in response to instructions sent by a client conversation module 818, or other client assistant embedded in web page 815, to a conversation server.

Conversation record 820 comprises a client version or subset of conversation record 310, described above with respect to FIG. 3A, for a respective conversation. Client conversation record 820 includes conversation metadata 822 needed by the client (e.g., a list of participants and their online status) and content contributions 824 that are the content of the conversation. Depending on the implementation and the capabilities of client 110, conversation record 820 optionally includes the attachments, if any, of the conversation. Thus, attachments may be downloaded to some clients (e.g., desktop and laptop computers), but not to others (e.g., mobile phones and personal digital assistants). In some embodiments, the attachments of the conversation are not downloaded until they are requested by the user. Alternately, in some embodiments, thumbnail images and/or snippets (e.g., selected text, if any) of some or all the attachments are automatically downloaded to client 110 along with the primary content of the conversation, and the full content of the attachments is downloaded to client 110 only upon user request.

Each of the above identified modules corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, memory 806 or the computer readable storage medium of memory 806 may store a subset of the modules and data structures identified above. Furthermore, memory 806 or the computer readable storage medium of memory 806 may store additional modules and data structures not described above.

Figure 9:
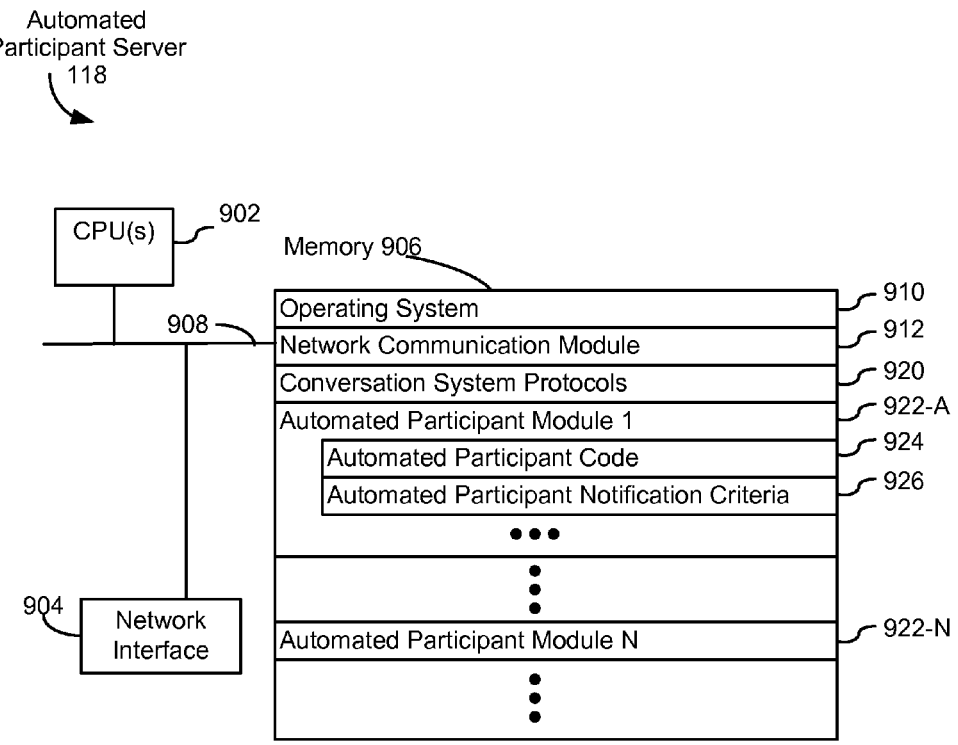
FIG. 9 is a block diagram of an automated participant server for a conversation system, according to certain embodiments.

FIG. 9 is a block diagram illustrating an automated participant server 118 in accordance with one embodiment. Automated participant server 118 is a computer system including one or more processing units (CPUs) 902, one or more network or other communications interfaces 904, memory 906, and one or more communication buses 908 for interconnecting these components. Communication buses 908 may include circuitry (sometimes called a chipset) that interconnects and controls communications between system components. Automated participant server 118 typically does not include a user interface, but in some embodiments automated participant server 118 does include a user interface having a display device and a keyboard.

Memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 906 optionally includes one or more storage devices remotely located from the CPU(s) 902. Memory 906, or alternately the non-volatile memory device(s) within memory 906, includes a non-transitory computer readable storage medium. In some embodiments, memory 906 or the computer readable storage medium of memory 906 stores the following programs, modules and data structures, or a subset thereof:

an operating system 910 that includes procedures for handling various basic system services and for performing hardware dependent tasks;

a network communication module 912 that is used for connecting automated participant server 118 to other computers via the one or more communication network interfaces 904 and one or more communication networks, such as the Internet, other wide area networks, local area networks, metropolitan area networks, and so on;

conversation system protocols 920 for interacting with conversations on a conversation system as an automated participant; and one or more automated participant modules 922, each module 922 for performing operations as a respective automated participant in a conversation, the automated participant module 922 including automated participant code 924 which determines the operations performed by the automated participant and automated participant notification criteria 926 to be provided to the conversation server 130 so as to indicate what events are to be reported to the automated participant (e.g., a transient table including notification criteria indicating the conditions under which an event, such as the modification, creation, or deletion of a conversation, should be reported to one or more automated participants), and what information is to be provided in the notification (e.g., a notification that content has changed, a copy of the entire conversation or a predefined portion of the conversation, such as a modified content contribution, a parent of the modified content contribution, siblings of the modified content contribution and/or children of the modified content contribution, etc.). Notification criteria 926 can be modified (e.g., restricted to fewer notifications or notifications including smaller amounts of content) as necessary to manage (e.g., reduce) the bandwidth and CPU usage of automated participant server 118 and conversation server 130.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 906 may store a subset of the modules and data structures identified above. Furthermore, memory 906 may store additional modules and data structures not described above.

Although FIG. 9 shows an automated participant server, FIG. 9 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on single servers and single items could be implemented by one or more servers. The actual number of servers used to implement an automated participant server system and how features are allocated among them will vary from one implementation to another, and may depend in part on the amount of data traffic that the system must handle during peak usage periods as well as during average usage periods. Additionally automated participant server 118 could be combined with another server that performs other communication related operations (e.g., automated participant server 118 described above may also include modules which perform functions typically associated with email servers or weblog servers).

Figure 10:
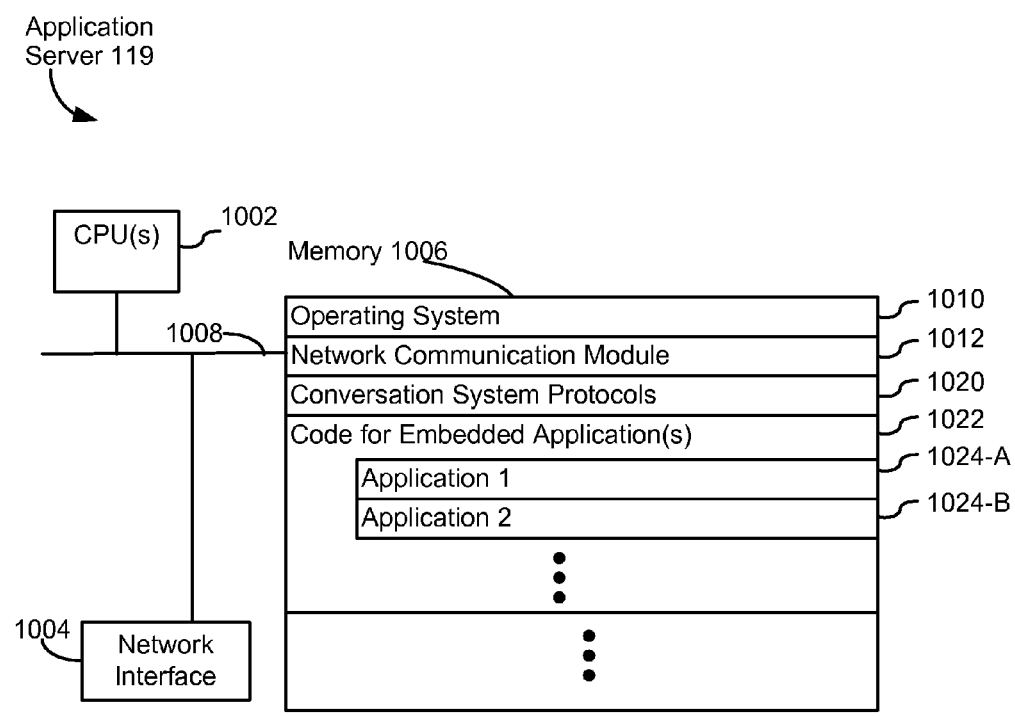
FIG. 10 is a block diagram of an application server for a conversation system, according to certain embodiments.
Figure 11A:
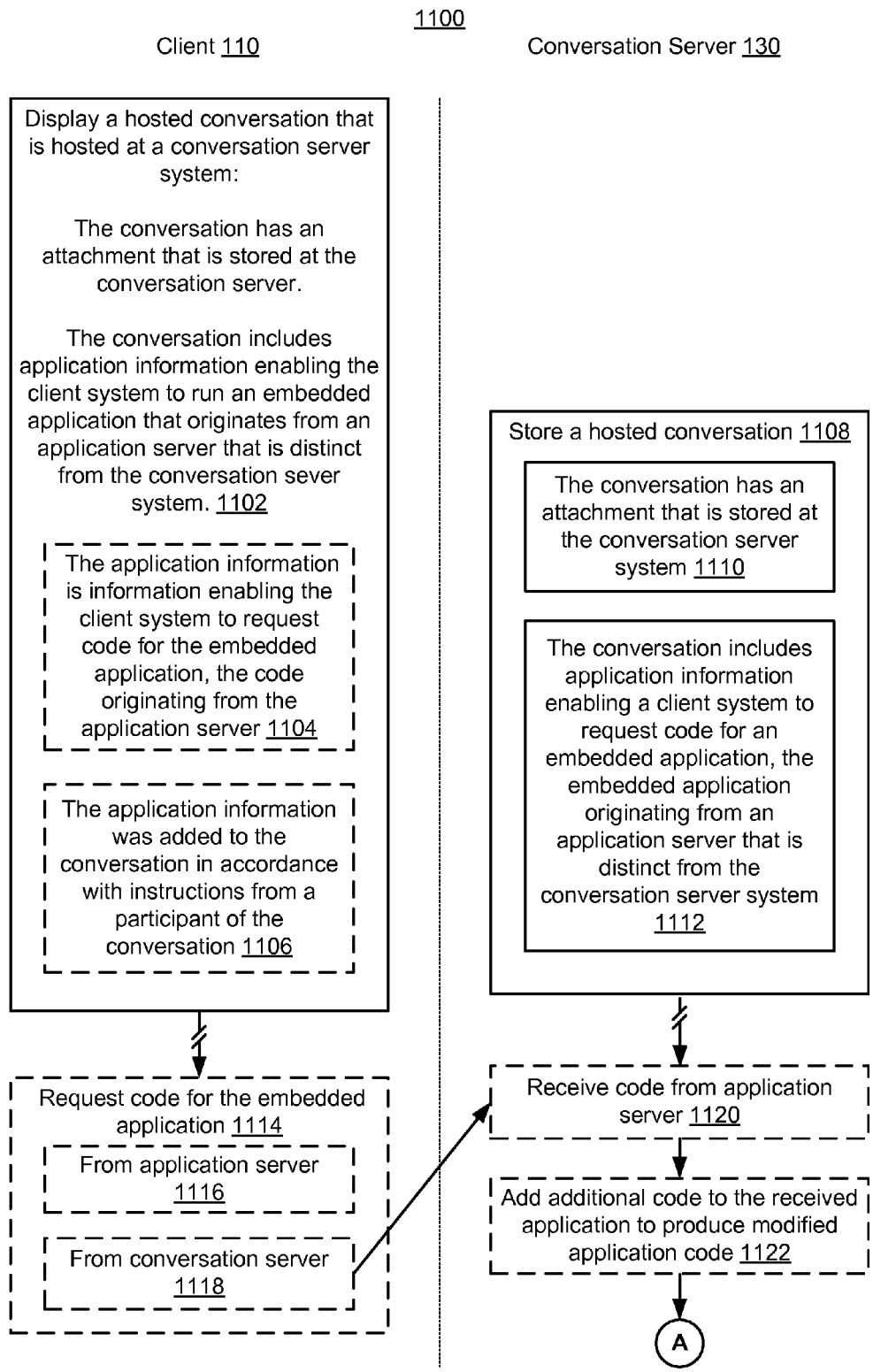
FIGS. 11A-11D are flowcharts representing a method for providing embedded applications access to attachments of hosted conversations, according to certain embodiments.
Figure 11B:
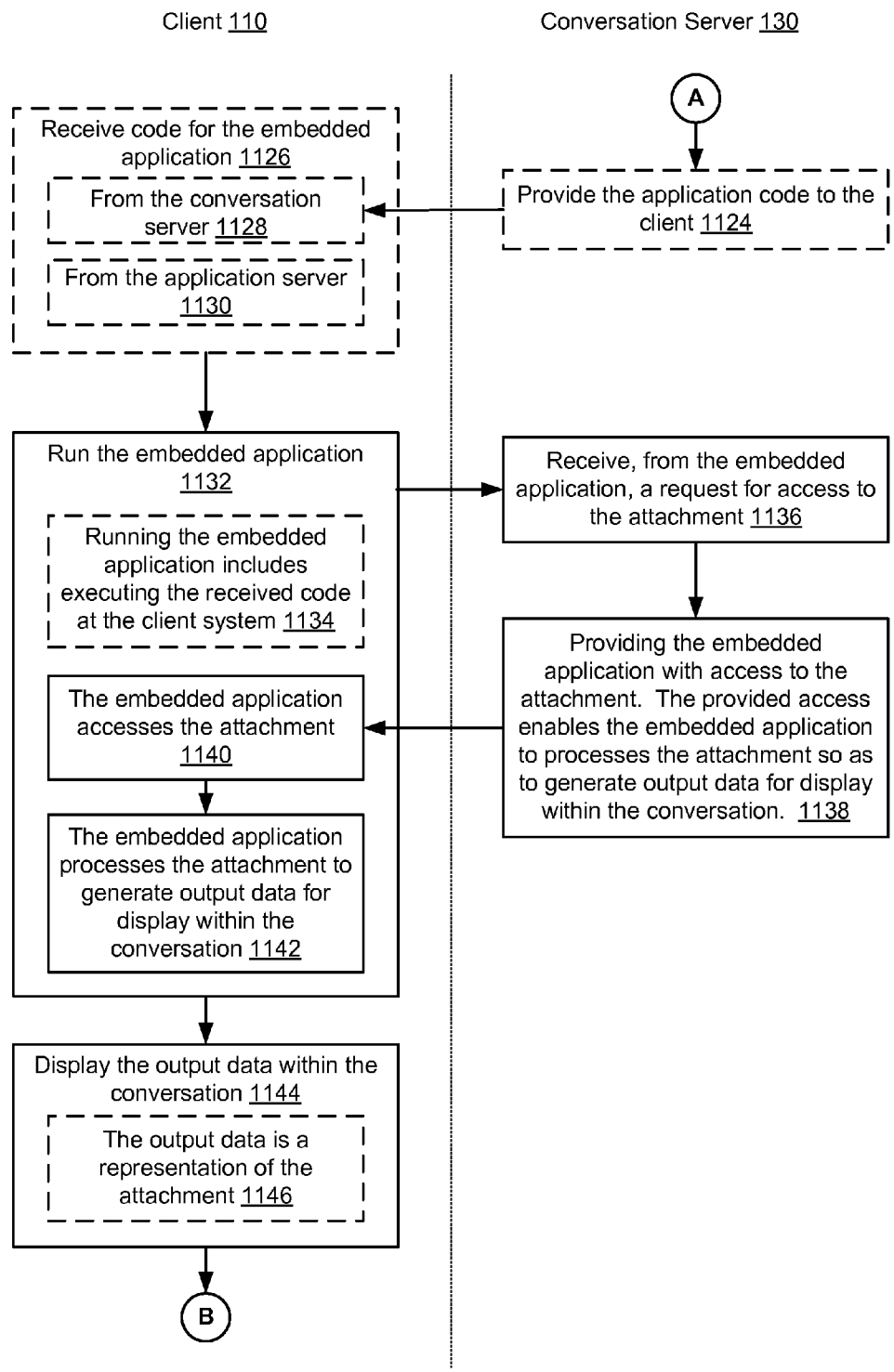
Figure 11C:
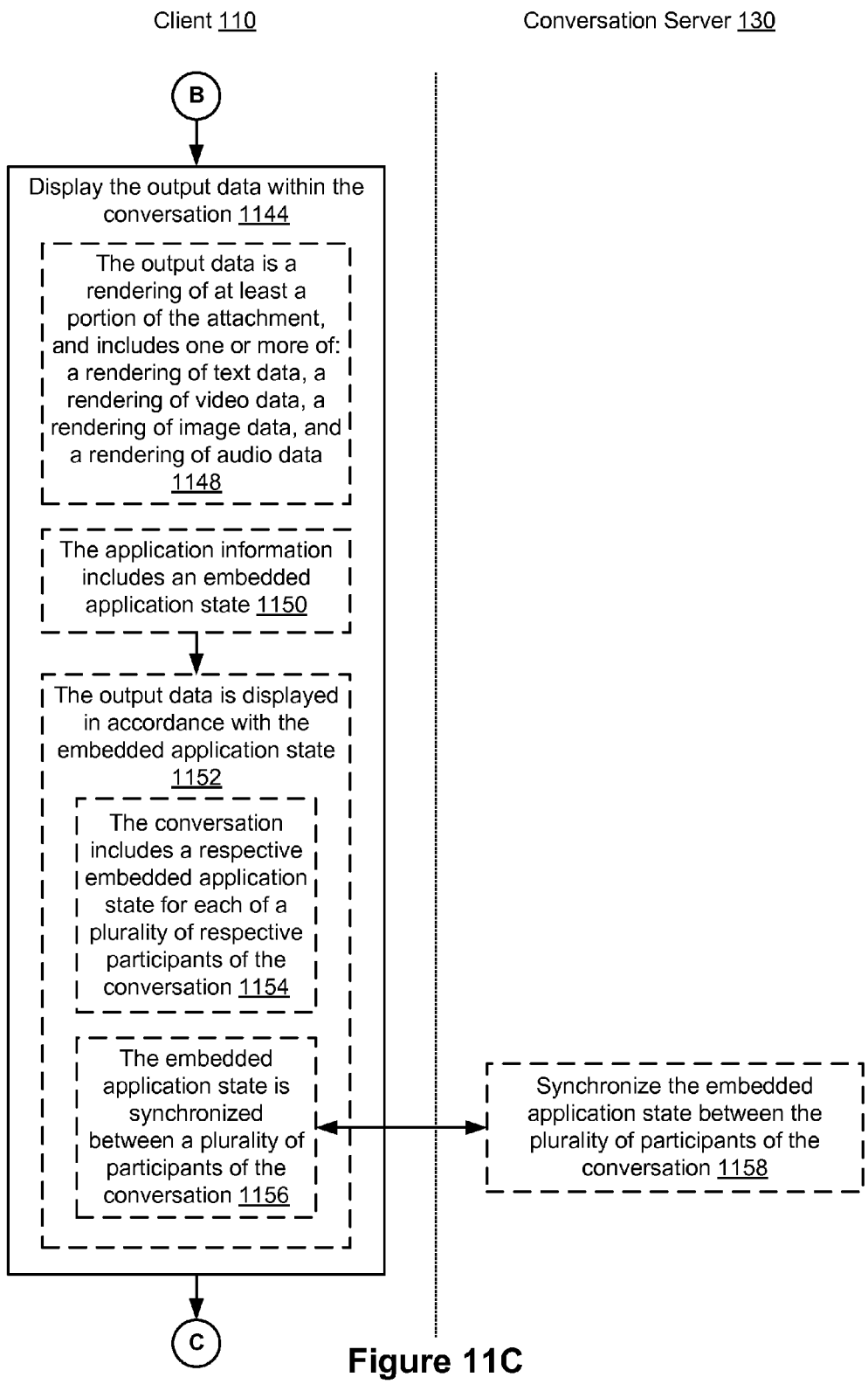
Figure 11D:
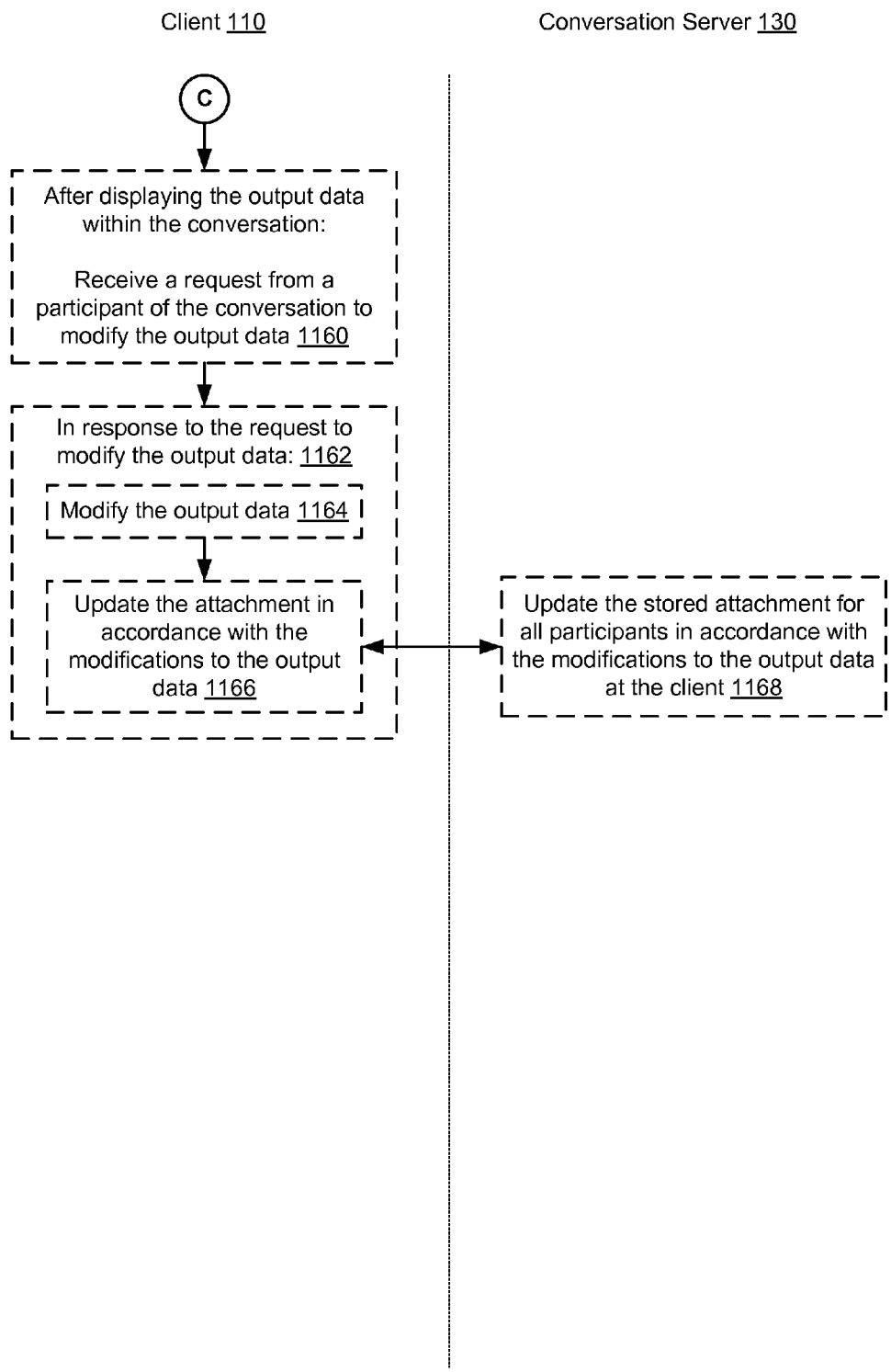

FIG. 10 is a block diagram illustrating an application server 119 in accordance with one embodiment. Application server 119 is a computer system including one or more processing units (CPUs) 1002, one or more network or other communications interfaces 1004, memory 1006, and one or more communication buses 1008 for interconnecting these components. Communication buses 1008 may include circuitry (sometimes called a chipset) that interconnects and controls communications between system components. Application server 119 typically does not include a user interface, but in some embodiments application server 119 does include a user interface having a display device and a keyboard.

Memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1006 optionally includes one or more storage devices remotely located from the CPU(s) 1002. Memory 1006, or alternately the non-volatile memory device(s) within memory 1006, includes a non-transitory computer readable storage medium. In some embodiments, memory 1006 or the computer readable storage medium of memory 1006 stores the following programs, modules and data structures, or a subset thereof:
- an operating system 1010 that includes procedures for handling various basic system services and for performing hardware dependent tasks;
- a network communication module 1012 that is used for connecting the application server 119 to other computers via the one or more communication network interfaces 1004 and one or more communication networks, such as the Internet, other wide area networks, local area networks, metropolitan area networks, and so on;
- conversation system protocols 1020 for receiving requests from clients and or conversation servers requesting code for embedded applications; and
- code for embedded applications 1022, including code for one or more embedded applications 1024, wherein the code for the embedded applications can be updated at application server 119 by a programmer or application owner.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1006 may store a subset of the modules and data structures identified above. Furthermore, memory 1006 may store additional modules and data structures not described above.

Although FIG. 10 shows a application server, FIG. 10 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 10 could be implemented on single servers and single items could be implemented by one or more servers. The actual number of servers used to implement an application server system and how features are allocated among them will vary from one implementation to another, and may depend in part on the amount of data traffic that the system must handle during peak usage periods as well as during average usage periods.

Other Applications

Another application that may be associated with the conversation server hosting a respective conversation includes a contextual spell checker and correction application. Such an application can be used to find common misspellings, and to disambiguate intentionally defined words. Such an application may use an error model to determine if an work is spelled or used correctly. The model may find common errors based on letter reversal, phonetic similarity, location in a conversation or letter, or using other means. The application may provide on-the-fly, context based text correction. In some embodiments, the application provides a user-specific overlay of words that a user frequently uses or that the user has defined. In some embodiments, the application may insert a tag with a suggestion for a word that it considers to be incorrectly spelled, such that any participant (not just the author) can address and correct the word, if necessary.

Another application that may be associated with the conversation server hosting a respective conversation includes a contextual name display, using context-dependent disambiguation. In some embodiments, this disambiguation may provide space efficiency when displaying names. For example, a close friend or work colleague may be displayed using a first name only or a picture, whereas a stranger may be displayed with full name, title, etc. A set of rules (defined by the system or by the user or both) may be used to determine who to display and in what manner.

Another application that may be associated with the conversation server hosting a respective conversation includes a language translation (machine translation) application. This machine translation application may use the spell checking and/or a context sensitive dictionary to translate between languages. In some embodiments, these (and other) applications use an application protocol interface (API) to interact with the conversation server hosting the conversation. In some embodiments, the application allows a participant to reserve a namespace for that participant's personal applications, which the participant may share with other participants.

FIGS. 11A-11E are flowcharts representing a method 1100 for providing embedded applications access to attachments of hosted conversations, according to some embodiments. These methods are governed by instructions that are stored in a computer readable storage medium and that are executed by one or more processors of one or more servers (e.g., conversation server 130) or clients 110. Each of the operations shown in FIGS. 11A-11D corresponds to instructions stored in a non-transitory computer memory or computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

Client 110 displays (1102) a hosted conversation that is hosted at a conversation server 130. The conversation has an attachment that is stored at conversation server 130. This hosted conversation typically includes a plurality of content contributions (e.g., including content from different participants). In some implementations or some conversations, the attachment is associated with one of the content contributions. In other implementations or in another conversation, the attachment is associated with the conversation as a whole and a representation of the attachment is displayed in a predefined location of the conversation (e.g., at the top of the conversation or at the bottom of the conversation).

The conversation includes application information enabling client 110 to run an embedded application that originates from an application server (e.g., 119 in FIGS. 1 and 10) that is distinct from conversation sever 130. In some embodiments the application information is (1104) information enabling client 110 to request code (e.g., executable instructions) for the embedded application, the code originating from application server 119. In some embodiments, the application information is an identifier that uniquely identifies the embedded application (e.g., a uniform resource locator (URL) or other resource identifier that identifies a source from which code for running the embedded application can be retrieved). Additionally, the application information may include additional information about the embedded application such as information indicating a state of the application, as described in greater detail below.

In some embodiments, the application information was added (1106) to the conversation in accordance with instructions from a participant of the conversation. In some embodiments, there are a plurality of embedded applications that can be added to any conversation, and the embedded applications are added to the conversation by or at the direction of participants in the conversation. In other words, the embedded applications are not built-in embedded applications that are part of the conversation system (e.g., system-wide .pdf viewers, image preview generators, etc.), rather the embedded applications are auxiliary applications that may or may not be associated with the conversation server and are added to the conversation on an "as-needed" basis, as determined by participants in the conversation. For example, there may be a gallery of different embedded applications which are available for users to select from. These different embedded applications may include applications with similar or overlapping functionality (e.g., a plurality of different .pdf viewers or movie viewers, etc.) and a participant can select a particular embedded application that suits the participant's needs. An advantage of using embedded applications that are selectable by participants of a conversation and hosted by separate application servers is that such embedded applications provide greater flexibility to the conversation system. In particular, participants will typically have a wider variety of applications to choose from and thus the conversation system will be able to better meet the needs of a larger number of users.

It should be understood that typically conversation server 130 stores (1108) a hosted conversation. The conversation has (1110) an attachment that is stored at conversation server 130. The conversation includes (1112) application information (e.g., an identifier which uniquely identifies the source of the embedded application) enabling a client 110 to request code for an embedded application that originates from application server 119 that is distinct from the conversation server. Client 110 is associated with a user who is a participant in the conversation hosted by conversation server 130. Additionally, one or more other participants may also access the hosted conversation from conversation server 130 (e.g., the conversation server associated with the participant) or other conversation servers in the conversation system.

In some embodiments, client 110 requests (1114) code for the embedded application (e.g., using the URL or other identifier). In some embodiments, the code is requested (1116) directly from application server 119 that is associated with the embedded application (e.g., an application server that is distinct from conversation server 130). In some other embodiments, the code is requested (1118) from conversation server 130, which, in turn must retrieve code from application server 119. It should be understood that, in some embodiments, the code for the embedded application is cached at conversation server 130 and is only retrieved from conversation server 130 periodically (e.g., on a predefined schedule or in response to receiving a communication from application server 119 indicating that the application has been updated). In other words, in these embodiments, whether the code is requested directly from application server 119 or from conversation server 130, at least a portion of the code for the embedded application originates from application server 119 that is distinct from conversation server 130. As noted above, application server 119 can be a third-party server, which is owned, and/or operated by a party other than: the party that owns and/or operates conversation server 130 and the party that owns/operates the client 110. However, application server 119 can also be a pseudo third-party server, which is owned and/or operated by the same party that owns and/or operates conversation server 130, but that is not integrated into the conversation system. For example, an operator of a conversation system could provide one or more servers that are available for third parties to host embedded application code so as to ensure that the code is readily available without substantively controlling the content of the embedded applications. It should be understood that in other embodiments, the content of the embedded applications is only constrained by a predefined set of guidelines (e.g., guidelines intended to prohibit malicious behavior) but is otherwise not controlled by the operator of the conversation system. In most implementations, however, application server 119 is distinct from conversation server 130.

Conversation server 130 optionally receives (1120) the code from application server 119, which is either received directly from application server 119 or is received from client 110 which received the code directly from application server 119. In some embodiments conversation server 130 adds (1122) additional code to the received application to produce modified application code. In other words, client 110 receives additional code for the embedded application that originates from conversation server 130. In some embodiments, this additional code is embedded application boilerplate that is common to a plurality of embedded applications from different application servers and enables the embedded applications to interact seamlessly with the conversation in which it is embedded. Adding this embedded application boilerplate to the embedded application code received from the application server is advantageous because it reduces the burden on programmers who are programming embedded applications and also enables the conversation system to be updated more easily, as the embedded application boilerplate can be updated at conversation server 130 whenever such an update is necessary so as to maintain compatibility of the applications with the conversation system.

Conversation server 130 provides (1124) the application code (e.g., either unmodified application code or the modified application code) to client 110. Client 110 receives (1126) code for the embedded application. In some embodiments the application code is received (1128) from conversation server 130. In some embodiments the application code is received (1130) from application server 119. It should be understood that, in various implementations, the application code is: requested from application server 119 and received from conversation server 130; requested from conversation server 130 and received from the application server 119; both requested and received from the application server 119; or both requested and received from conversation server 130.

Client 110 runs (1132) the embedded application. In some embodiments, running the embedded application includes executing (1134) the received code at the client 110. In some embodiments, the embedded application requests access to an attachment associated with the conversation that is stored at the conversation server 130. Conversation server 130 receives (1136), from the embedded application, the request for access to the attachment, and provides (1138) the embedded application with access to the attachment (e.g., by sending the attachment to client 110 or by providing the embedded application with information, such as a URL, enabling client 110 to retrieve the attachment). The provided access enables the embedded application to processes the attachment so as to generate output data for display within the conversation, as described in greater detail below.

The embedded application at client 110 accesses (1140) the attachment and processes (1142) the attachment to generate output data for display within the conversation. After the output data has been generated, client 110 displays (1144) the output data within the conversation. In some embodiments, the conversation is displayed as a structured electronic document, and the embedded application renders the output data for display within the structured electronic document (e.g., within an inline frame (iFrame) that is part of the structured electronic document). In some embodiments, the output data is (1146) a representation of the attachment (e.g., a thumbnail or a slideshow for images, an audio player or audio editor object for playing audio files, a video player or video editor object for playing video files, a map viewer application for viewing map data, etc.). In some embodiments, the output data is (1148) a rendering of at least a portion of the attachment, and includes one or more of: a rendering of text data, a rendering of video data, a rendering of image data, and a rendering of audio data.

In some embodiments, the application information includes (1150) an embedded application state, and the output data is displayed (1152) in accordance with the embedded application state. For example an embedded application state may indicate a current position within an attachment (e.g., a current timecode for a video attachment or a current paused location for an audio attachment). As another example, the attachment includes a map and the state of the application is a currently displayed portion of the map. Additionally, if the embedded application is displaying a slideshow (e.g., of images or powerpoint slides, etc.), the state of the application would indicate the current image or slide that is being displayed.

In some of these embodiments, the conversation includes a plurality of participants and the conversation includes (1154) a respective embedded application state for each respective participant of the plurality of participants. In other words, in these embodiments, for a single embedded application that is embedded in a conversation with a first participant and a second participant, it is possible for the first participant to have a first embedded application state, while the second participant has a second embedded application state and the first embedded application state is different from the second embedded application state. For example two participants could use the same embedded application to view a video, where the application state for a respective participant indicates the last viewed position in the video for that respective participant.

In contrast, in some implementations, or in some conversations (e.g., conversations configured to have a synchronized application state, or conversations having an embedded application that is configured to have a synchronized application state for all participants), the conversation includes a plurality of participants and the embedded application state is synchronized (1156) between the plurality of participants (e.g., if one participant repositions a map, the map is repositioned for all participants, or if one participant plays through a media file, the current position of the participant is the same for all participants). Thus, in some implementations or some conversations conversation server 130 stores a shared embedded application state in the conversation, and when one participant updates the state of the embedded application state, the updated state of the embedded application is synchronized (1158) for all participants by conversation server 130. It should be understood that this synchronization may be performed in a manner that uses the same approaches described above for synchronizing the content of the conversation (e.g., the synchronized embedded application state is stored as a value of a parameter of the embedded application, and the value is updated in accordance with the concurrency controls described above). Additionally, in conversations having multiple different embedded applications, some of the embedded applications may use synchronized embedded application states, while other embedded applications use participant-specific embedded application states. Similarly, when an application has multiple states, one or more of the states may be a synchronized embedded application state while one or more of the other states may be a participant-specific embedded application state.

In some embodiments, after displaying the output data within the conversation, client 110 receives (1160) a request from a participant of the conversation to modify the output data. In response (1162) to the request to modify the output data, client 110 modifies (1164) the output data. After modifying the output data, client 110 updates (1166) the attachment in accordance with the modifications to the output data. Conversation server 130 optionally also updates (1168) stored attachment for all participants in accordance with the modifications to the output data at the client 110. As one example, when the embedded application is an audio editing application and the output data is a representation of the audio data, and the request to modify the output data is a request to edit the representation of the audio data (e.g., the participant trims a user selected amount of audio data (e.g., the first 30 seconds) from an audio clip). In this example, in response to receiving the request, the audio attachment is trimmed (e.g., by client 110 or conversation server 130) the attachment stored at conversation server 130 is updated to reflect the changes to the representation of the audio data (e.g., the underlying attachment is edited). In some embodiments, an unmodified version of the attachment is also stored in conversation server 130. It should be understood that the unmodified version of the attachment may be stored at the time the attachment is edited or at an earlier time. Additionally, the original, unmodified, attachment can be made available to any of the participants via an "undo" button or a conversation history view, where changes to the conversation are tracked and participants are able to view the conversation at an earlier state (e.g., before the attachment was modified).

Note that details of other processes described herein with respect to methods 500, 1200, 1300 (e.g., FIGS. 5A-5E, 12A-12C, and 13A-13C) are also applicable in an analogous manner to method 1100 described above. For example, the conversation described above with reference to method 1100 may have one or more of the characteristics of the various conversations described herein with reference to methods 500, 1200, and/or 1300. For brevity, these details are not repeated here.

Figure 12A:
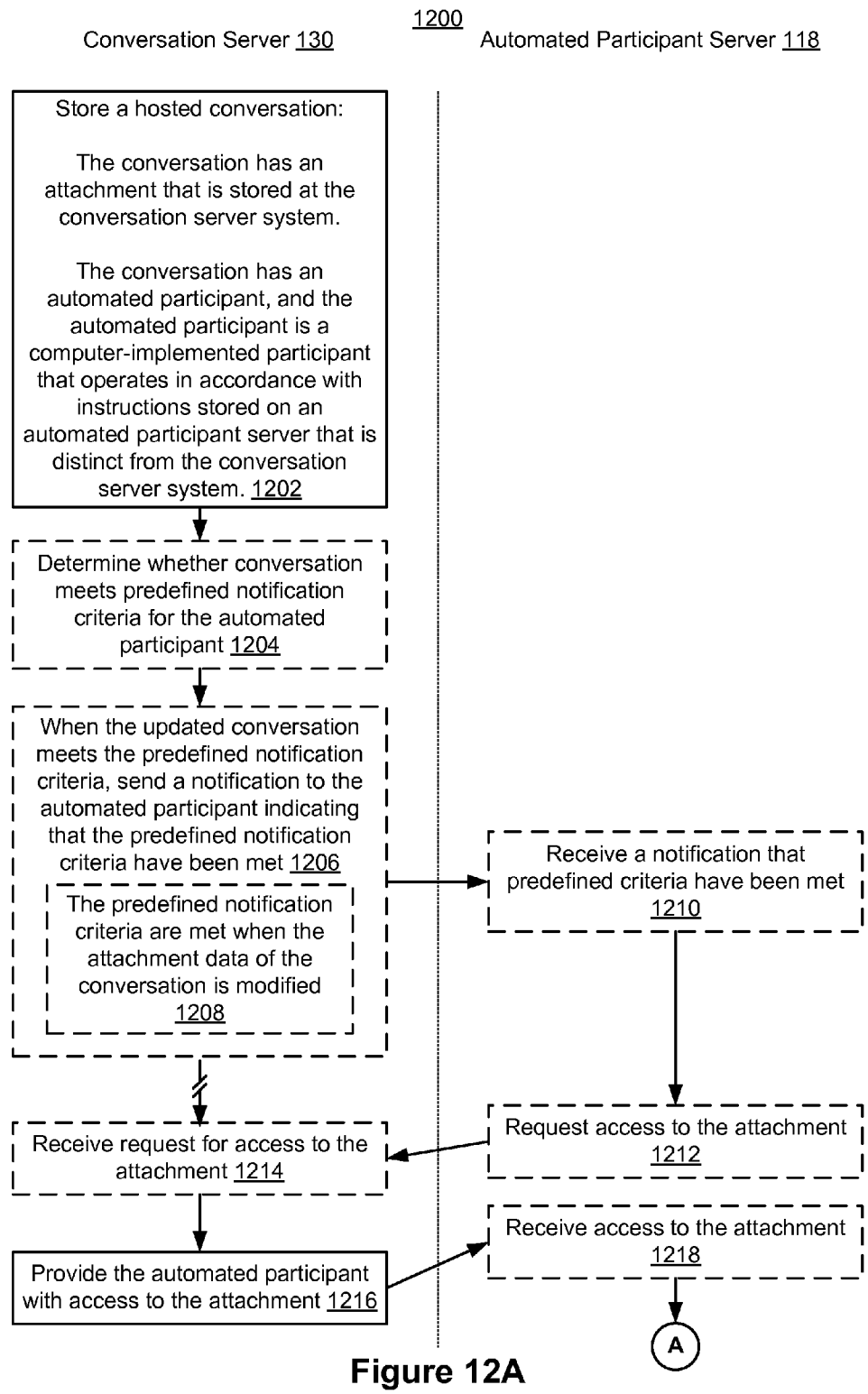
FIGS. 12A-12C are flowcharts representing a method for providing automated participants access to attachments of hosted conversations, according to certain embodiments.
Figure 12B:
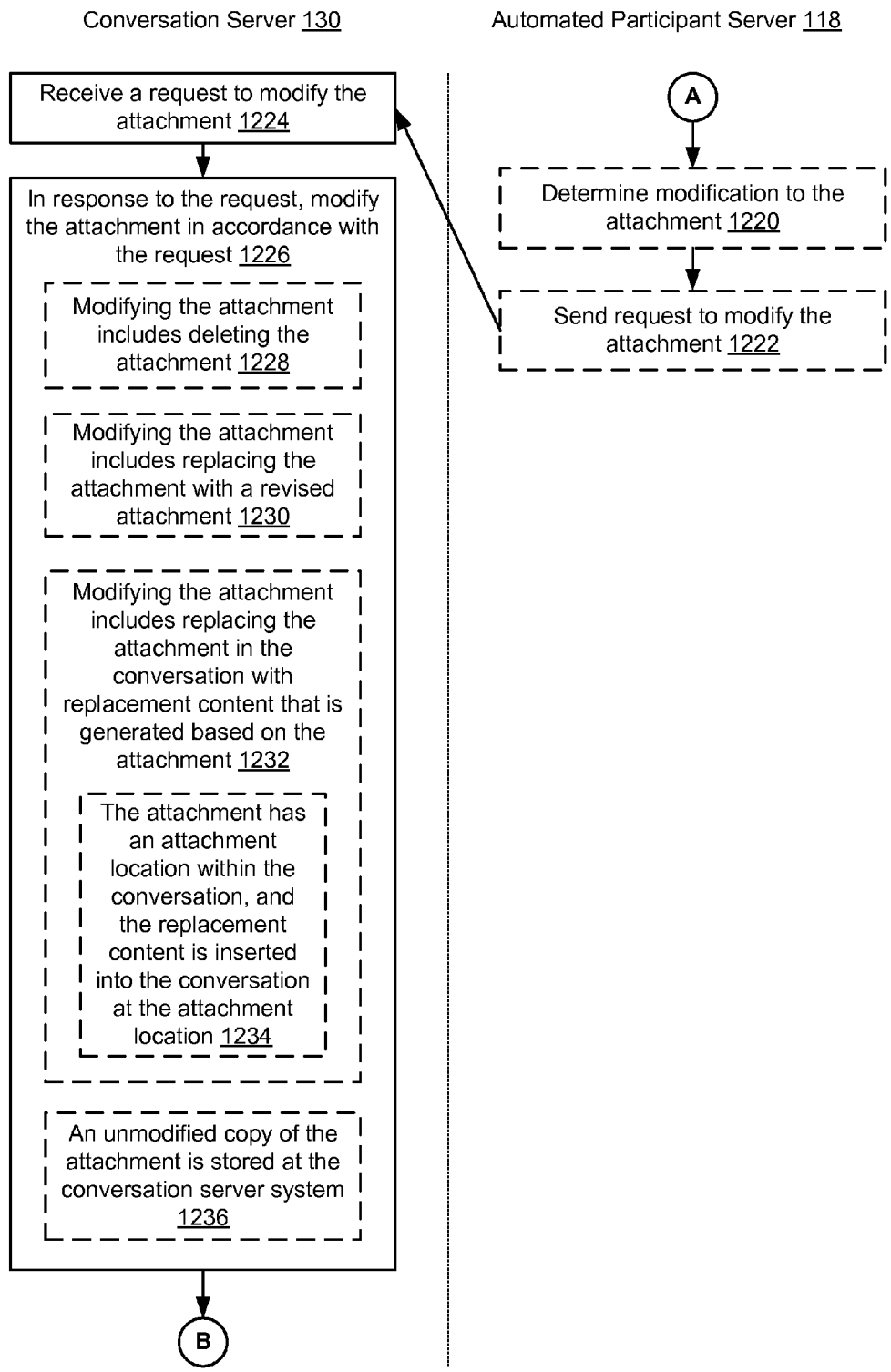
Figure 12C:
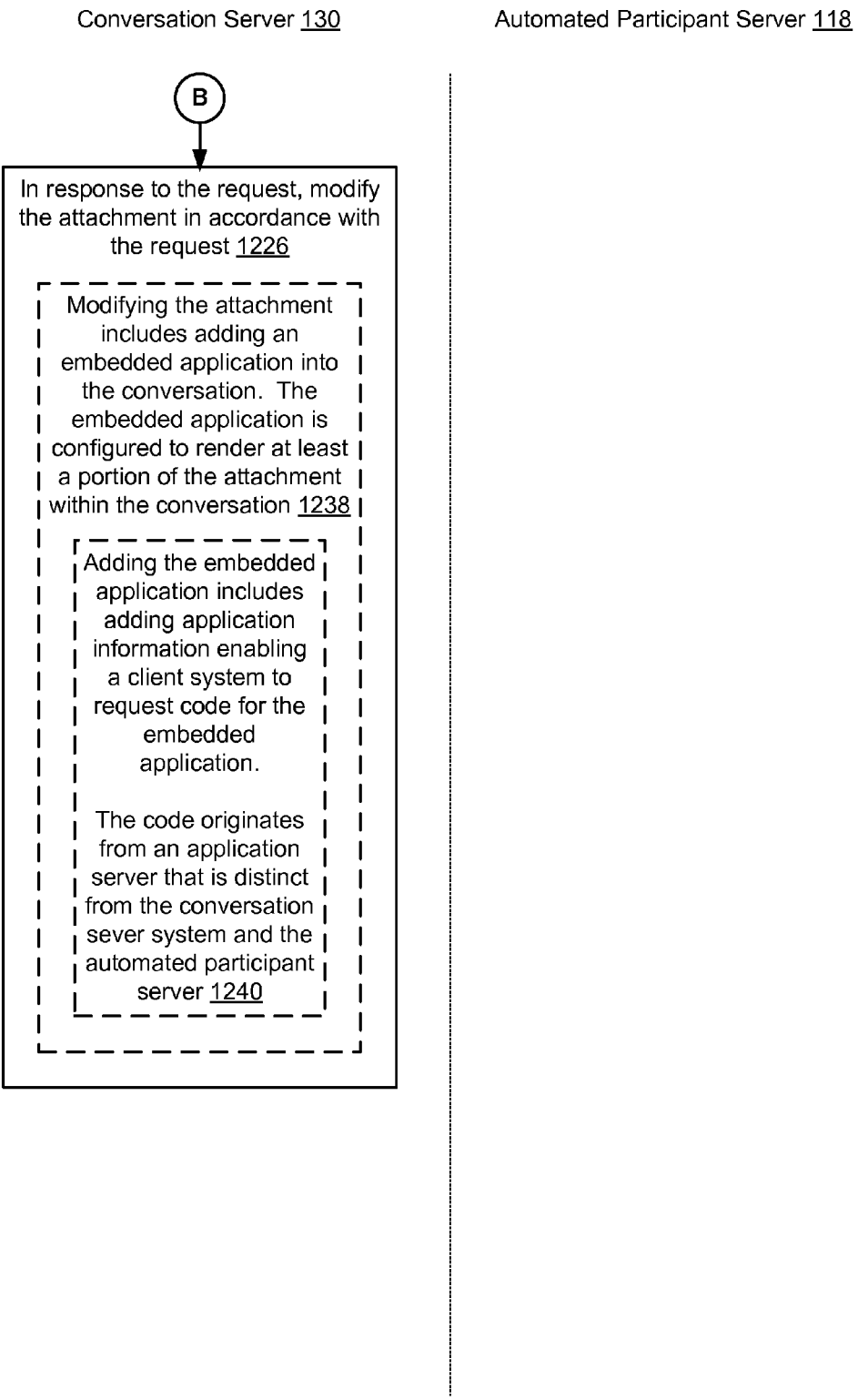

FIGS. 12A-12C are flowcharts representing a method 1200 for providing automated participants with access to attachments of hosted conversations, according to some embodiments. These methods are governed by instructions that are stored in a computer readable storage medium and that are executed by one or more processors of one or more servers (e.g., conversation server 130 or automated participant server 118). Each of the operations shown in FIGS. 12A-12C corresponds to instructions stored in a non-transitory computer memory or computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

Conversation server 130 stores (1202) a hosted conversation. The conversation has an attachment that is stored at conversation server 130. The conversation has an automated participant, and the automated participant is a computer-implemented participant that operates in accordance with instructions stored on an automated participant server 118 that is distinct from conversation server 130. In some embodiments, automated participant server 118 is a third-party server (e.g., a server which is owned, and/or operated by a party other than: the party that owns and/or operates conversation server 130 and the party that owns/operates client 110.) However, automated participant server 118 can also be a pseudo third-party server, which is owned and/or operated by the same party that owns and/or operates conversation server 130, but that is not integrated into the conversation system. For example, an operator of a conversation system could provide one or more automated participant servers that are available for third parties to host automated participant code so as to ensure that the code is readily available without substantively controlling the content of the automated participant code. It should be understood that in other embodiments, the content of the automated participant code is only constrained by a predefined set of guidelines (e.g., guidelines intended to prohibit malicious behavior) but is otherwise not controlled by the operator of the conversation system. In most implementations, however, automated participant server 118 is distinct from conversation server 130.

In some embodiments, prior to providing the automated participant with access to the attachment, the conversation server 130 determines (1204) whether the conversation meets predefined notification criteria (e.g., 756 in FIG. 7) for the automated participant. In some embodiments, conversation server 130 is provided with information from a plurality of automated participants indicating which events related to hosted conversation (e.g., creation, deletion, modification) should be reported to the automated participant. In some embodiments this information is used to generate a transient table that includes the automated participant notification criteria. An event stream including all of the events (e.g., creation, deletion, modification, etc.) for all of the conversations hosted by the conversation server 130 can then be checked against the automated participant notification criteria, and any events which match automated participant notification criteria are then reported to the respective automated participant. For example, an automated participant may request notifications of any additions to conversations by user X or any additions or deletions of content contributions to hosted conversation Y, the addition of a response to a particular content contribution in a particular conversation, the creation of a new conversation that includes specific terms, or the addition of a particular tag or label to any hosted conversation, etc. However, for the purposes of the presently described embodiments one of the notification criteria will typically relate to the modification of attachment information for a hosted conversation (e.g., when an attachment has been added to the conversation, an attachment has been deleted from the conversation or an existing attachment has been modified).

When the updated conversation meets the predefined notification criteria, conversation server 130 sends (1206) a notification to the automated participant indicating that the predefined notification criteria have been met (e.g., by sending a notification that an attachment has been added/modified, sending a new/modified attachment, etc.) In some embodiments, the predefined notification criteria are met (1208) when the attachment data of the conversation is modified, as described above. While the exemplary embodiments herein are described primarily with reference to embodiments where automated participants are automatically notified in accordance with notification criteria, it should be understood that there are other ways for the automated participants to determine that attachment data of a conversation has been modified. For example, an automated participant server may periodically request a status of attachment data for one or more hosted conversations from the conversation server and compare the current version of the attachment data for the conversation with a previous version of the attachment data for the conversation to determine whether any relevant changes have been made to the attachment data of the hosted conversation.

In some embodiments, automated participant server 118 receives (1210) the notification that the predefined criteria have been met. In response to receiving the notification, automated participant server 118 requests (1212) access to the attachment from conversation server 130, which is received (1214) by conversation server 130. Additionally, in some embodiments, automated participant server 118 requests access to the conversation whenever the automated participant is added to a conversation (e.g., when another participant adds the automated participant to the conversation for the first time).

Conversation server 130 provides (1216) automated participant 118 with access to the attachment. In some embodiments, the access is provided to automated participant server 118 after or in response to the request from the automated participant (e.g., automated participant server 118), as described above with respect to operations 1206-1214. In some embodiments, the access is granted to automated participant server 118 automatically (e.g., in response to determining that the predefined notification criteria have been met automated participant server 118 is provided with access to the attachment without waiting for a request from automated participant server 118). In some embodiments, providing access to an attachment includes sending a copy of the attachment to automated participant server 118. In other embodiments, providing access to an attachment includes providing automated participant server 118 with the information enabling the automated participant server 118 to access the attachment stored at conversation server 130.

Automated participant server 118 receives (1218) access to the attachment. Automated participant server 118 determines (1220) modifications to be made to the attachment and sends (1222) a request to conversation server 130 to modify the attachment. Conversation server 130 receives (1224), from the automated participant (e.g., at automated participant server 118), the request to modify the attachment. In response to the request, conversation server 130 modifies (1226) the attachment in accordance with the request.

It should be understood that the request to modify the attachment may include any of a number of possible modifications, including but not limited to modifications which augment, alter, replace or delete the attachment. In some implementations, or in some circumstances, modifying the attachment includes deleting (1228) the attachment. In some implementations, or in some circumstances, modifying the attachment includes replacing (1230) the attachment with a revised attachment. It should be understood that the revised attachment may have revised content or may merely be a copy of the original attachment that has been converted from an original file type of the attachment to an updated file type of the revised content (e.g., from a comma delimited list .csv to a spreadsheet .xls, from one word processing document format, e.g., .doc, to another word processing format, e.g., .docx, etc.). Similarly, the revised content may be a file that has been changed from an original file size of the attachment to an updated file size of the revised content (e.g., a reduced resolution version of a photo, etc.). In other embodiments, the revised content may be a file that has been transcoded from an original media format of the attachment to an updated media format of the revised content (e.g., changing video/audio codec from H.246 to VP8, Theora or another codec, etc.). In other embodiments, the revised content is substantively different from the attachment (e.g., when the revised content is an updated version of the attachment that has been revised by a user and is added to the hosted conversation to synchronize the attachment with a document management system).

In some embodiments, modifying the attachment includes replacing (1232) the attachment in the conversation with replacement content that is generated based on the attachment. As one example, the attachment is a .pdf document that is processed by automated participant server 118 to identify text within the .pdf document and then at least a portion of the text is added to the conversation (e.g., a menu is converted from a .pdf to text, and the text version of the menu is inserted into the conversation). In some of these embodiments (e.g., where the modification includes replacing the attachment), the attachment has an attachment location within the conversation, and the replacement content is inserted (1234) into the conversation at the attachment location. Continuing the menu example from above, the menu is inserted into a portion of the conversation that is a discussion of what to order for lunch, and automated participant server 118 replaces the .pdf menu with a text menu. This text menu is easier for the participants to use for their discussion of what to order for lunch (e.g., because the text menu allows participants to easily cut, paste, modify and insert comments within the text of the menu). It should be apparent from the discussion above that, in some embodiments, the attachment location is within the "body" of the conversation. In other words, the attachment location is not a generic attachment location (e.g., a region of the conversation that includes a list of attachments that are associated with the conversation as a whole). Typically the attachment location will be determined by a participant when the participant adds the attachment to the conversation. In some embodiments and/or some circumstances, the attachment location is explicitly specified by the participant as part of the attachment process. In some embodiments or some circumstances, the attachment location is automatically determined by conversation server 130 in accordance with the participant's actions (e.g., the attachment location is determined to be the content contribution of the conversation that is currently being modified by the user when the attachment is added to the conversation or the attachment location is determined to be a location proximate to a current location of cursor or text entry caret of the user within the conversation when the attachment is added to the conversation). For example, in some implementations, an attachment location is automatically determined by the conversation server 130 for a respective attachment at the time the attachment is added to the conversation unless the participant adding the respective attachment specifies a particular location within the conversation.

In some embodiments, an unmodified copy of the attachment is stored (1236) at the conversation server before and after the modifying (e.g., so that the unmodified copy of the attachment can be restored after the attachment has been modified, if necessary). In some embodiments, restoring the attachment is performed using a dedicated "undo" button (sometimes called an undo affordance), displayed in the communications user interface or webpage in which the conversation is displayed. In other embodiments, the entire conversation has a conversation history which is used to view an attachment at an earlier state, and, optionally, restore the earlier state of the attachment in the current conversation. As one example, each change represented in history log 360 can be replayed in chronological order or reverse chronological order to view the state of the conversation (including the state of any attachments). In this example, when an earlier state of an attachment is displayed, a participant may have the option of restoring the attachment in the conversation to that earlier state (e.g., by selecting a displayed "restore" button, sometimes called a restore affordance, associated with the attachment).

In some embodiments, modifying the attachment includes adding (1238) an embedded application into the conversation, where the embedded application is configured to render at least a portion of the attachment within the conversation. In some embodiments, the embedded application is displayed in an inline frame (iFrame) within the conversation. For example, if the attachment is an audio file, modifying the attachment may include inserting a reference to an embedded application that is an audio player capable of playing the audio file. Thus, from the participant's perspective, after attaching an audio file to the conversation, an audio player object enabling the audio file to be played appears automatically without any further user intervention due to the addition of the embedded application by automated participant server 118. In some of these embodiments, adding the embedded application includes adding application (1240) information enabling a client to request code for the embedded application, the code originating from an application server (e.g., 119 in FIGS. 1 and 10) that is distinct from conversation sever 130 and automated participant server 118 (e.g., the embedded application is an embedded application as described in greater detail above with reference to method 1100).

Note that details of other processes described herein with respect to methods 500, 1100, 1300 (e.g., FIGS. 5A-5E, 11A-11D, and 13A-13C) are also applicable in an analogous manner to method 1200 described above. For example, the conversation described above with reference to method 1200 may have one or more of the characteristics of the various conversations described herein with reference to methods 500, 1100, and/or 1300. For brevity, these details are not repeated here.

Figure 13A:
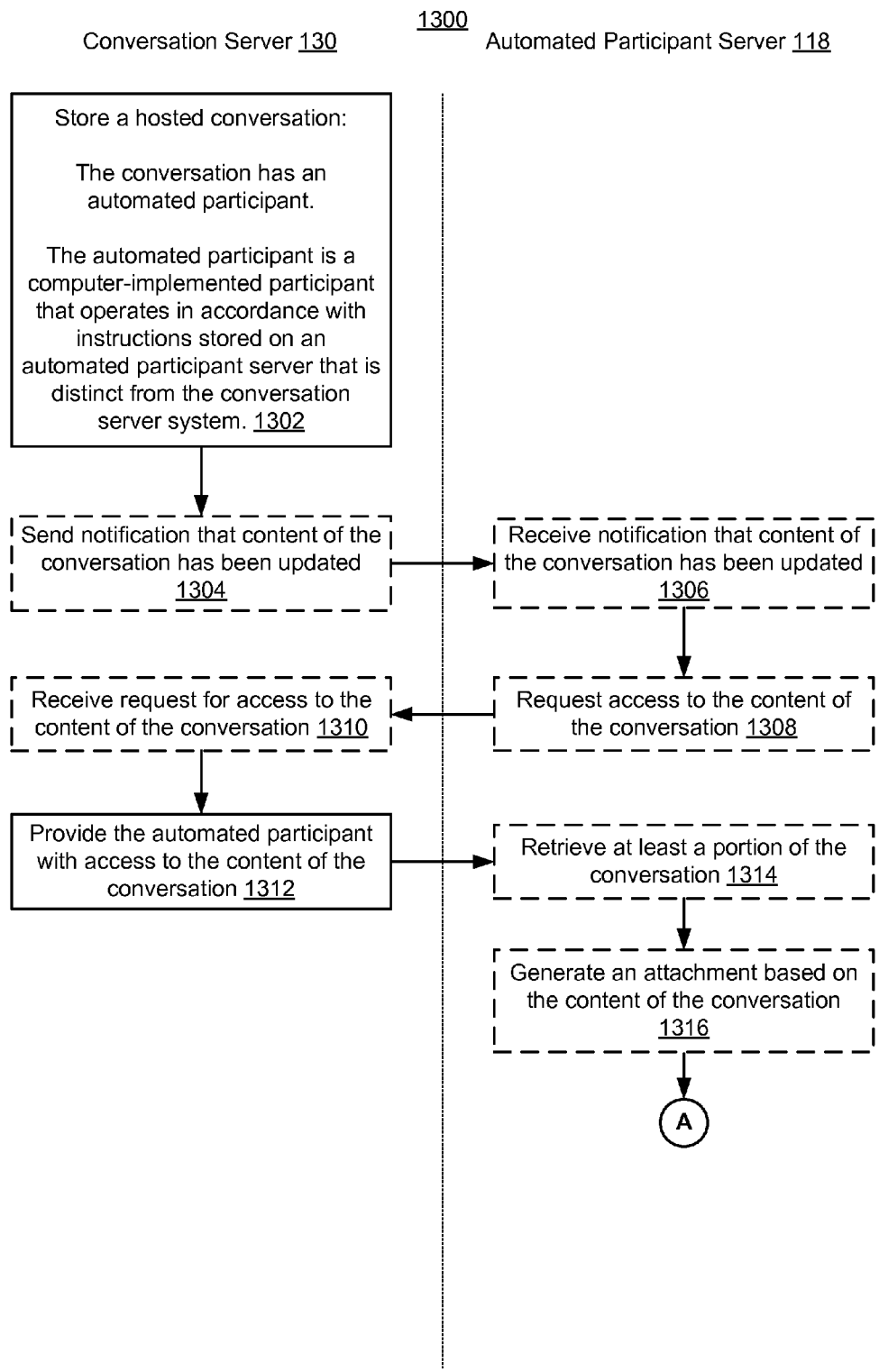
FIGS. 13A-13C are flowcharts representing a method for providing automated participants access to content of hosted conversations, according to certain embodiments.
Figure 13B:
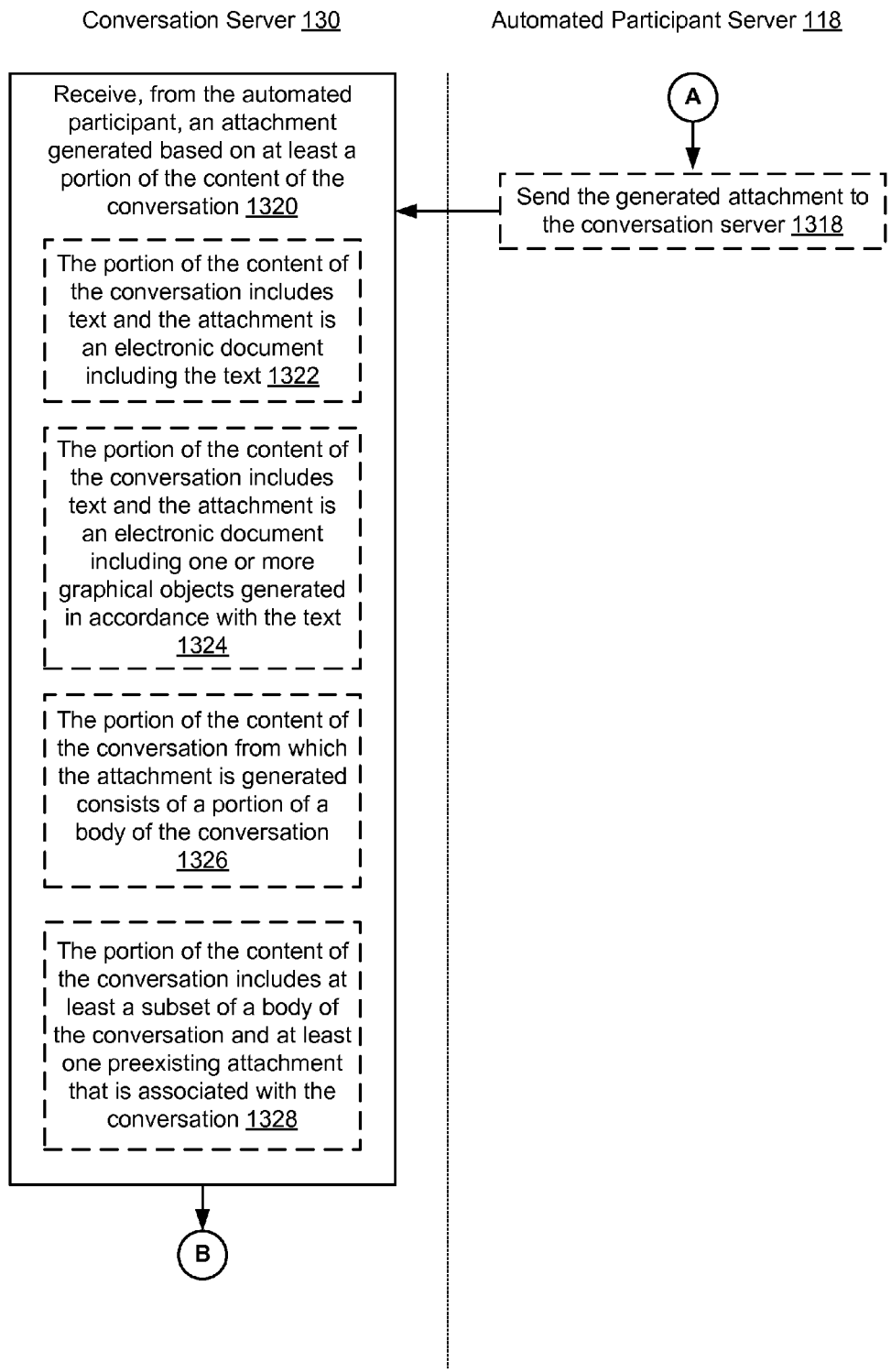
Figure 13C:
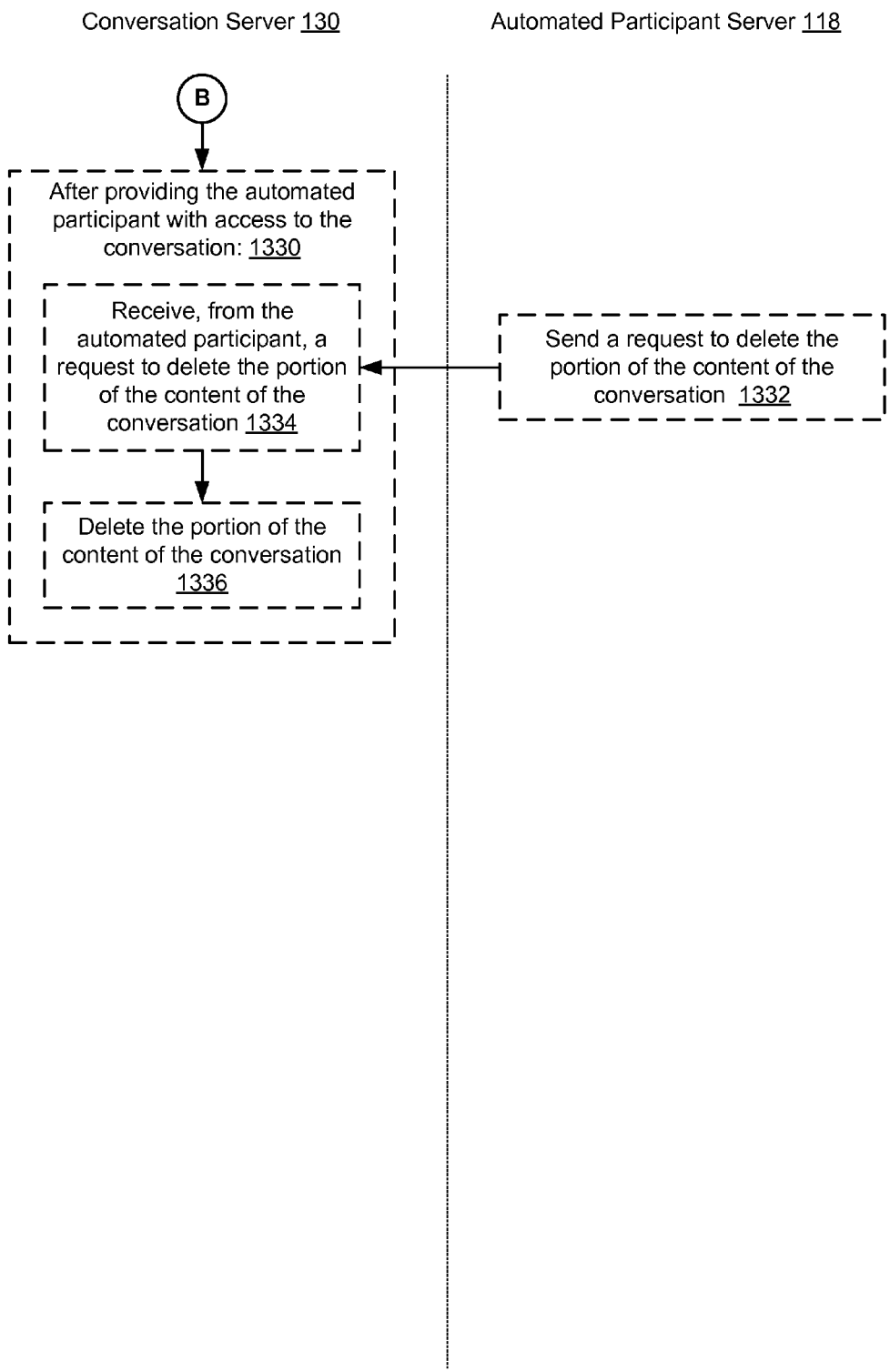

FIGS. 13A-13C are flowcharts representing a method 1300 for providing automated participants with access to content of hosted conversations, according to some embodiments. These methods are governed by instructions that are stored in a computer readable storage medium and that are executed by one or more processors of one or more servers (e.g., conversation server 130 or automated participant server 118). Each of the operations shown in FIGS. 13A-13C corresponds to instructions stored in a non-transitory computer memory or computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

Conversation server 130 stores (1302) a hosted conversation. The conversation has an automated participant, and the automated participant is a computer-implemented participant that operates in accordance with instructions stored on an automated participant server 118 that is distinct from conversation server 130. In some embodiments, automated participant server 118 is a third-party server (e.g., a server which is owned, and/or operated by a party other than: the party that owns and/or operates conversation server 130 and the party that owns/operates client 110.) However, as described above, automated participant server 118 can also be a pseudo third-party server, which is owned and/or operated by the same party that owns and/or operates conversation server 130, but that is not integrated into the conversation system. For example, an operator of a conversation system could provide one or more servers that are available for third parties to host automated participant code so as to ensure that the code is readily available without substantively controlling the content of the automated participant code. It should be understood that in other embodiments, the content of the automated participant code is only constrained by a predefined set of guidelines (e.g., guidelines intended to prohibit malicious behavior) but is otherwise not controlled by the operator of the conversation system. Typically, however, automated participant server 118 is distinct from conversation server 130.

In some embodiments, conversation server 130 sends (1304) the notification that content of the conversation has been updated (e.g., in response to determining that predefined notification criteria 756 in FIG. 7 have been met, as described in greater detail above). In some implementations, content of the conversation refers to non-attachment content of the conversation (e.g., text and/or images that have been added to the body of a content unit of the conversation). Automated participant server 118 receives (1306) the notification that content of the conversation has been updated and, requests (1308) access to the content of the conversation. For example, automated participant server 118 may be notified that a particular participant has added a content contribution to a conversation or that a particular word has been added to a content contribution of a conversation, or that a new content contribution has been added to a conversation. Additionally, in some embodiments, automated participant server 118 requests access to the conversation whenever the automated participant is added to the conversation (e.g., when another participant adds the automated participant to the conversation for the first time).

In some embodiments, conversation server 130 receives (1310) the automated participant's request for access to the content of the conversation. Conversation server 130 provides (1312) the automated participant (e.g., automated participant server 118) with access to content of the conversation. It should be understood that, in accordance with some embodiments, the access is in response to the request from automated participant server 118, while in other embodiments, the access is automatically granted (e.g., in response to determining that the predefined notification criteria have been met, automated participant server 118 is provided with access to the attachment without waiting for a request from automated participant server 118).

After receiving access to the content of the conversation, automated participant server 118 retrieves (1314) at least a portion of the conversation. In some implementations, automated participant server 118 generates (1316) an attachment based on the content of the conversation, and sends (1318) the generated attachment to conversation server 130. In other words, in accordance with some embodiments, automated participant server 118 automatically, without user intervention, converts content of a conversation into a file, which is transmitted to conversation server 130 for attachment to the conversation.

Conversation server 130 receives (1320), from the automated participant (e.g., automated participant server 118), an attachment generated based on at least a portion of the content of the conversation. In some embodiments, the portion of the content of the conversation includes text, and the attachment is (1322) an electronic document including the text. For example, when the conversation has a plurality of content contributions, the automated participant converts each content contribution into a slide of a presentation document or a page of a word processing document and attaches the presentation document or the word processing document to the conversation. In some implementations, the portion of the content of the conversation from which the attachment is generated includes text, and the attachment is (1324) an electronic document including one or more graphical objects generated in accordance with the text (e.g., a pie chart generated based on a text-based table, or a document rendered by processing html markup). In some implementations, the portion of the content of the conversation from which the attachment is generated consists of (1326) a portion of a body of the conversation (e.g., the generated attachment is a .pdf file and the .pdf file includes text from the body of the conversation). In some implementations, the portion of the content of the conversation includes (1328) at least a subset of a body of the conversation and at least one preexisting attachment that is associated with the conversation. For example, the conversation includes an image attachment and text describing the image attachment, and the generated attachment is a presentation document (e.g., a powerpoint slide deck) including the image and the text describing the image.

In some embodiments, the operations 1334-1336 described next are performed after (1330) providing the automated participant with access to the conversation. Automated participant server 118 sends (1332) a request to delete a portion of the content from the conversation (e.g., the portion of the conversation from which the attachment was generated). The conversation receives (1334), from the automated participant, a request to delete the portion of the content of the conversation. In response to the request to delete the portion of the content of the conversation, conversation server 130 deletes (1336) the portion of the content of the conversation. Thus, the automated participant can actually replace content of the conversation by generating an attachment based on the content and then requesting that the conversation server 130 delete the content from the conversation.

Conversations of communication systems are frequently used for group collaboration (e.g., preparing a presentation, a sales pitch, a research document, etc.). However, in order to generate a final document, using conventional methods, the content of the conversation must be manually extracted and converted to an attachment. However, the above described embodiments provide a way for an automated participant to extract content from a conversation and process the content to produce an attachment which is subsequently attached to the conversation. This enables automated participants to perform tasks which previously were performed manually by human participants. Freeing up human participants from manually performing tasks such as extracting content from a conversation and converting the content into an attachment improves the efficiency of the human participants, thereby providing substantial advantages over conventional methods for producing attachments for a conversation based on content of the conversation.

Note that details of other processes described herein with respect to methods 500, 1100, 1200 (e.g., FIGS. 5A-5E, 11A-11D, and 12A-12C) are also applicable in an analogous manner to method 1300 described above. For example, the conversation described above with reference to method 1300 may have one or more of the characteristics of the various conversations described herein with reference to methods 500, 1100, and/or 1200. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   at a conversation server having one or more processors and memory storing one or more programs for execution by the one or more processors so as to perform the method:
   storing a conversation between at least two participants that are subscribed to the conversation, wherein:
   the conversation has an attachment with an attachment location that is inserted into a portion of the conversation based on content of the portion of the conversation and is stored at the conversation server; and
   the conversation has an automated participant, and the automated participant is a computer-implemented participant that operates in accordance with instructions stored on an automated participant server that is distinct from the conversation server;
   providing the automated participant with access to the attachment;
   receiving, from the automated participant, a request to modify the attachment; and
   in response to the request, modifying the attachment in accordance with the request by the automated participant and receiving an edit of the attachment from one of the at least two participants, wherein the attachment is modified by adding an embedded application into the conversation based on adding application information enabling a client to request code for the embedded application, wherein the embedded application is configured to render at least a portion of the attachment within the conversation, and wherein the code is originated from an application server that is distinct from the conversation server and the automated participant server.

2. The method of claim 1, further comprising, prior to providing the automated participant with access to the attachment:
   determining whether the conversation meets predefined notification criteria for the automated participant; and
   when the conversation meets the predefined notification criteria, sending a notification to the automated participant indicating that the predefined notification criteria have been met.

3. The method of claim 2, wherein the predefined notification criteria are met when the attachment of the conversation is modified.

4. The method of claim 1, wherein modifying the attachment includes deleting the attachment.

5. The method of claim 1, wherein modifying the attachment includes replacing the attachment with a revised attachment.

6. The method of claim 1, wherein modifying the attachment includes replacing the attachment in the conversation with replacement content that is generated based on the attachment.

7. The method of claim 1 further comprising determining modifications to the attachment by the automated participant and wherein the request is based on the modifications.

8. The method of claim 1, wherein an unmodified copy of the attachment is stored at the conversation server before and after the modifying.

9. The method of claim 1, wherein the conversation includes both structured content added by the automated participant and unstructured content added by a non-automated participant.

10. A non-transitory computer readable storage medium and one or more computer programs embedded therein, the one or more computer programs comprising instructions, which when executed by a computer system, cause the computer system to:
   store a conversation between at least two participants that are subscribed to the conversation, wherein:
   the conversation has an attachment with an attachment location that is inserted into a portion of the conversation based on content of the portion of the conversation and is stored at the conversation server; and
   the conversation has an automated participant, and the automated participant is a computer-implemented participant that operates in accordance with instructions stored on an automated participant server that is distinct from the conversation server;
provide the automated participant with access to the attachment;
receive, from the automated participant, a request to modify the attachment; and
in response to the request, modify the attachment in accordance with the request by the automated participant and receive an edit of the attachment from one of the at least two participants, wherein the attachment is modified by adding an embedded application into the conversation based on adding application information enabling a client to request code for the embedded application, wherein the embedded application is configured to render at least a portion of the attachment within the conversation, and wherein the code is originated from an application server that is distinct from the conversation server and the automated participant server.

11. A computer system, comprising:
one or more processors;
memory; and
one or more programs, wherein the one or more programs are stored in the memory and configured to be executed by the one or more processors, the one or more programs including instructions for:
storing a conversation between at least two participants that are subscribed to the conversation, wherein:
the conversation has an attachment with an attachment location that is inserted into a portion of the conversation based on content of the portion of the conversation and is stored at the conversation server; and
the conversation has an automated participant, and the automated participant is a computer-implemented participant that operates in accordance with instructions stored on an automated participant server that is distinct from the conversation server;
providing the automated participant with access to the attachment;
receiving, from the automated participant, a request to modify the attachment; and
in response to the request, modifying the attachment in accordance with the request by the automated participant and receiving an edit of the attachment from one of the at least two participants, the modifying including adding an embedded application into the conversation based on adding application information enabling a client to request code for the embedded application, wherein the embedded application is configured to render at least a portion of the attachment within the conversation, and wherein the code is originated from an application server that is distinct from the conversation server and the automated participant server.

12. A method comprising:
at a conversation server having one or more processors and memory storing one or more programs for execution by the one or more processors so as to perform the method:
storing a conversation between at least two participants that are subscribed to the conversation, wherein the conversation has an automated participant, and the automated participant is a computer-implemented participant that operates in accordance with instructions stored on an automated participant server that is distinct from the conversation server;
providing the automated participant with access to content of the conversation;
receiving, from the automated participant, an attachment generated based on at least a portion of the content of the conversation that is inserted into the conversation based on the content of the conversation; and
receiving, from the automated participant, modifications to the attachment, the modifications including adding an embedded application into the conversation based on adding application information enabling a client to request code for the embedded application, wherein the embedded application is configured to render at least a portion of the attachment within the conversation, and wherein the code is originated from an application server that is distinct from the conversation server and the automated participant server.

13. The method of claim 12, wherein:
the one or more portions of the content of the conversation include text; and
the attachment is an electronic document including the text.

14. The method of claim 12, wherein:
the one or more portions of the content of the conversation include text; and
the attachment is an electronic document including one or more graphical objects generated in accordance with the text.

15. The method of claim 12, wherein the one or more portions of the content of the conversation from which the attachment is generated consist of a second portion of a body of the conversation.

16. The method of claim 12, wherein the one or more portions of the content of the conversation include at least a subset of a body of the conversation and at least one preexisting attachment that is associated with the conversation.

17. The method of claim 12, further comprising, after providing the automated participant with access to the content of the conversation:
receiving, from the automated participant, a request to delete the one or more portions of the content of the conversation; and
deleting the one or more portions of the content of the conversation.

18. The method of claim 12, wherein the conversation includes both structured content added by the automated participant and unstructured content added by a non-automated participant.

19. A non-transitory computer readable storage medium and one or more computer programs embedded therein, the one or more computer programs comprising instructions, which when executed by a computer system, cause the computer system to:
store a conversation between at least two participants that are subscribed to the conversation, wherein the conversation has an automated participant, and the automated participant is a computer-implemented participant that operates in accordance with instructions stored on an automated participant server that is distinct from the conversation server;
provide the automated participant with access to content of the conversation;
receive, from the automated participant, an attachment generated based on at least a portion of the content of the conversation that is inserted into the conversation based on the content of the conversation; and
receive, from the automated participant, modifications to the attachment, the modifications including adding an embedded application into the conversation based on adding application information enabling a client to request code for the embedded application, wherein the embedded application is configured to render at least a portion of the attachment within the conversation, and wherein the code is originated from an application server that is distinct from the conversation server and the automated participant server.

20. A computer system, comprising:
one or more processors;
memory; and
one or more programs, wherein the one or more programs are stored in the memory and configured to be executed by the one or more processors, the one or more programs including instructions for:
    storing a conversation between at least two participants that are subscribed to the conversation, wherein the conversation has an automated participant, and the automated participant is a computer-implemented participant that operates in accordance with instructions stored on an automated participant server that is distinct from the conversation server;
    providing the automated participant with access to content of the conversation;
    receiving, from the automated participant, an attachment generated based on at least a portion of the content of the conversation that is inserted into the conversation based on the content of the conversation; and
    receiving, from the automated participant, modifications to the attachment, the modifications including adding an embedded application into the conversation based on adding application information enabling a client to request code for the embedded application, wherein the embedded application is configured to render at least a portion of the attachment within the conversation, and wherein the code is originated from an application server that is distinct from the conversation server and the automated participant server.

\* \* \* \* \*